US010351239B2

(12) United States Patent
Di Benedetto et al.

(10) Patent No.: US 10,351,239 B2
(45) Date of Patent: Jul. 16, 2019

(54) UNMANNED AERIAL VEHICLE DELIVERY SYSTEM

(71) Applicant: Drone Delivery Canada Corp., Vaughan (CA)

(72) Inventors: Paul Di Benedetto, Vaughan (CA); Gregory Colacitti, Vaughan (CA)

(73) Assignee: Drone Delivery Canada Corp., Vaughan (CA)

( * ) Notice: Subject to any disclaimer, the term of this patent is extended or adjusted under 35 U.S.C. 154(b) by 0 days.

(21) Appl. No.: 15/331,147

(22) Filed: Oct. 21, 2016

(65) Prior Publication Data

US 2018/0111683 A1    Apr. 26, 2018

(51) Int. Cl.
| | |
|---|---|
| *G08G 5/00* | (2006.01) |
| *H04N 5/77* | (2006.01) |
| *B64C 39/02* | (2006.01) |
| *G01C 21/00* | (2006.01) |
| *G01C 21/20* | (2006.01) |

(Continued)

(52) U.S. Cl.
CPC ............ *B64C 39/024* (2013.01); *G01C 21/00* (2013.01); *G01C 21/20* (2013.01); *G06Q 10/083* (2013.01); *G06Q 30/04* (2013.01); *G08G 5/0013* (2013.01); *G08G 5/0026* (2013.01); *G08G 5/0034* (2013.01); *G08G 5/0069* (2013.01); *G08G 5/0082* (2013.01); *H04N 5/772* (2013.01); *B64C 2201/128* (2013.01)

(58) Field of Classification Search
CPC ...... G01C 21/00; G06Q 10/083; G06Q 30/04; G08G 5/0034; H04N 5/772

USPC .............................................................. 701/3
See application file for complete search history.

(56) References Cited

U.S. PATENT DOCUMENTS

| | | |
|---|---|---|
| 7,584,071 B2 | 9/2009 | Lee |
| 8,106,748 B2 | 1/2012 | Lee |

(Continued)

FOREIGN PATENT DOCUMENTS

| | | |
|---|---|---|
| DE | 102014105583 A1 | 10/2015 |
| DE | 102014213023 A1 | 1/2016 |

(Continued)

OTHER PUBLICATIONS

DRONENET The next BIG thing; Global Guerrillas, Wednesday, Jan. 2, 2013.

(Continued)

*Primary Examiner* — Maceeh Anwari
(74) *Attorney, Agent, or Firm* — Bereskin & Parr LLP/S.E.N.C.R.L., s.r.l.

(57) ABSTRACT

An unmanned aerial vehicle (UAV) delivery system, for delivering articles between UAV zones has a computing system having a non-transient memory with executable instructions, the executable instructions including a flight management system to receive at a portal a delivery request to deliver an article from one zone to another. The Instructions are operable: to assign a UAV to the delivery request; if a UAV is not at a first zone, to dispatch a UAV to the first zone; to provide a flight path to the UAV,I at least part of the flight path being predetermined; to communicate the UAV flight path to the UAV; and to monitor the flight of the UAV from the first zone to the second zone and the delivery of the article. A method of planning a route for an unmanned aerial vehicle (UAV) is also provided.

27 Claims, 24 Drawing Sheets

(51) Int. Cl.
    *G06Q 10/08* (2012.01)
    *G06Q 30/04* (2012.01)

(56) References Cited

U.S. PATENT DOCUMENTS

| | | | |
|---|---|---|---|
| 8,948,935 | B1 | 2/2015 | Peeters et al. |
| 9,051,043 | B1 | 6/2015 | Peeters et al. |
| 9,056,676 | B1 | 6/2015 | Wang |
| 9,120,568 | B2 | 9/2015 | Herman et al. |
| 9,174,733 | B1 | 11/2015 | Burgess et al. |
| 9,244,147 | B1 | 1/2016 | Soundararajan et al. |
| 9,302,783 | B2 | 4/2016 | Wang |
| 9,305,280 | B1 | 4/2016 | Berg et al. |
| 9,334,052 | B2 | 5/2016 | Pasko et al. |
| 9,384,668 | B2 | 7/2016 | Raptopoulos et al. |
| 9,387,928 | B1 | 7/2016 | Gentry et al. |
| 9,429,953 | B1 | 8/2016 | Miller et al. |
| 9,459,620 | B1 | 10/2016 | Schaffalitzky |
| 9,527,605 | B1 | 12/2016 | Gentry et al. |
| 9,536,216 | B1* | 1/2017 | Lisso ............... G06Q 10/0832 |
| 9,573,684 | B2 | 2/2017 | Kimchi et al. |
| 2005/0154653 | A1 | 7/2005 | Jongebloed |
| 2011/0264311 | A1 | 10/2011 | Lee et al. |
| 2012/0143482 | A1 | 6/2012 | Goossen et al. |
| 2013/0332008 | A1 | 12/2013 | Herman et al. |
| 2014/0032034 | A1 | 1/2014 | Raptopoulos et al. |
| 2015/0120094 | A1 | 4/2015 | Kimchi el |
| 2015/0158587 | A1 | 6/2015 | Patrick et al. |
| 2015/0317597 | A1 | 11/2015 | Shucker et al. |
| 2015/0339933 | A1 | 11/2015 | Batla et al. |
| 2015/0336669 | A1 | 12/2015 | Kantor et al. |
| 2015/0353195 | A1 | 12/2015 | Peeters et al. |
| 2015/0370251 | A1 | 12/2015 | Siegel et al. |
| 2015/0379874 | A1* | 12/2015 | Ubhi ..................... G01S 5/0027 701/3 |
| 2016/0001883 | A1 | 1/2016 | Sanz et al. |
| 2016/0016664 | A1 | 1/2016 | Basuni |
| 2016/0033966 | A1 | 2/2016 | Farris et al. |
| 2016/0163204 | A1 | 6/2016 | Raptopoulos et al. |
| 2016/0189101 | A1 | 6/2016 | Kantor et al. |
| 2016/0200438 | A1 | 7/2016 | Bokeno et al. |
| 2016/0239803 | A1 | 8/2016 | Borley et al. |
| 2016/0284221 | A1 | 9/2016 | Hinkle et al. |

FOREIGN PATENT DOCUMENTS

| | | | |
|---|---|---|---|
| WO | 2015061008 | A1 | 4/2015 |
| WO | 2015175242 | A1 | 11/2015 |
| WO | 2015168573 | A1 | 2/2016 |
| WO | 2016019242 | A1 | 2/2016 |
| WO | 2016037219 | A1 | 3/2016 |
| WO | 2016094067 | A1 | 6/2016 |

OTHER PUBLICATIONS

International Search Report and Written Opinion, PCT/CA2017/051259, dated Feb. 1, 2018.

* cited by examiner

Tracking Information

FILTERS

☐ Show Historical Shipments

Date Range    STATUS    -- Select --    SEARCH

NEW SHIPMENT

| Date | Tracking # | From | To | Dep Time | Arr time | Status | |
|---|---|---|---|---|---|---|---|
| 2016-10-07 | 2 | WIDGETS INC. KW Warehouse 1 Main St. | ACME KW Head Office 1 High Street | | | In Queue | EDIT |

FIG. 14A

New Shipment

| | | | | |
|---|---|---|---|---|
| From | Depot 2 (Mississauga, ON) | | KW Warehouse (St. Jacobs) | |
| Package Dimensions | Height<br>1 | Width<br>4 | Length<br>9 | Units<br>in |
| Package Weight | 6.690 | kg | Package Value | 13.72 USD |
| Priority | Urgent | | | |
| Reference #1 | | | | |
| Reference #2 | | | | |
| Comments | Soft, malleable object of high density; may be heavier than appears. | | | |

CANCEL | SUBMIT

FIG. 14B

ACME.

Q Search  & Username▾

SHIPPING
DEPOTS
SETTINGS

DEPOTS

Logistics Platform

Assigned Depots

| DEPOT NAME | DEPOT ID | LOCATION | | |
|---|---|---|---|---|
| ACMETOR1 | 83938933 | Toronto | ▭ | ⌄ |

| DEPOT NAME | DEPOT ID | LOCATION | | |
|---|---|---|---|---|
| ACMEVAN2 | 82342345 | Vancouver | ▭ | ⌃ |

| ○ ZONE #1 | ○ ZONE #2 | ○ ZONE #3 | ○ ZONE #4 |
|---|---|---|---|
| IN FLIGHT | OPEN | MAINTENANCE | DRONE PREP |
| INBOUND | AVAILABLE | NOT AVAILABLE | OUTBOUND |
| UAV DDC0121 TRACKING 160NACME00002 | | | UAV DDC0121 TRACKING 160NACME00002 |

DRONE
DELIVERY CANADA.COM

FIG. 14C

Assets

FILTERS
 CATEGORIES
-- Select --

| Category | Asset ID | SKU # | Description | Status |
|---|---|---|---|---|
| UAV | 155 | AB-1234 | Test | New |
| UAV | 156 | AB-1234 | Test | New |
| UAV | 157 | AB-1234 | Test | New |
| Battery | 158 | B-7899 | 24 volt quick charge battery | Assigned to customer |
| Battery | 159 | B-7899 | 24 volt quick charge battery | Assigned to customer |
| UAV | 160 | AB-1234 | Test | New |
| UAV | 161 | AB-1234 | Test | New |
| Antenna | 162 | AB-1234 | 2.4 GHz antenna | New |
| UAV | 163 | HL-050 | UAV light load 50 lbs | Assigned to customer |
| UAV | 164 | HL-050 | UAV light load 50 lbs | Assigned to customer |

<<  <  1  2  3  4  5  6  7  8  9  10  11  12  13  14  >  >>

CREATE ASSETS

FIG. 14D

SEARCH FILTERS

Customer

X CLEAR ALL

RESULTS

| Ticket ID | Assigned to | Department | Priority | Subject | Status |
|---|---|---|---|---|---|
| 1 | John Smith | Technical Support | High | Hey there | Open |
| 2 | | Sales Support | High | How much | Open |
| 3 | John Smith | Technical Support | Normal | How does this work | Open |
| 4 | | General Support | High | Login problem | Closed |
| 5 | | General Support | High | How much do you charge? | Open |
| 6 | | Sales Support | High | How long will it take | Open |
| 7 | Mike Brown | Technical Support | High | How far can you deliver | Open |
| 8 | | Technical Support | High | Reset PW | Open |
| 11 | | General Support | High | Test | Open |
| 12 | | Technical Support | High | Test | Open |

1  2  3  4  >  >>

CREATE NEW TICKET

FIG. 14E

UNMANNED AERIAL VEHICLE DELIVERY SYSTEM

FIELD

The present disclosure relates to unmanned aerial vehicles.

INTRODUCTION

The following paragraphs are not an admission that anything discussed in them is prior art or part of the knowledge of persons skilled in the art.

Unmanned aerial vehicles (UAVs) have been coming into prominence and have been, in some situations, implemented at consumer levels. An obstacle to expanding the uses of UAVs has been public safety.

Know proposals for using UAVs can be found in U.S. Pat. Nos. 9,174,733 and 9,244,147; and U.S. Publication Nos. 201201453482, 20140032034 and 20150120094, the contents of all of which are incorporated by reference.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In an one aspect of the disclosure, there is provided an unmanned aerial vehicle (UAV) delivery system, for delivering articles between at least one first UAV zone and at least one second UAV zone, comprising:

at least one computing system having a non-transient memory with executable instructions, the executable instructions including a flight management system;

a first UAV zone;

a second UAV zone;

wherein the computing system is operable with said instructions:

a) to provide an article delivery portal, to receive at the portal at least one delivery request to deliver at least one article from the first zone to the second zone;

b) to assign a UAV to the delivery request;

c) if a UAV is not at the first UAV zone, to dispatch a UAV to the first zone, including providing the UAV with a flight path to the first UAV zone;

d) providing a flight path to the UAV, from the first zone to the second zone, at least part of the flight path being predetermined;

e) to communicate the UAV flight path to the UAV; and f) to monitor the flight of the UAV from the first zone to the second zone and the delivery of the article.

In a further aspect of the disclosure, there is provided an unmanned aerial vehicle (UAV) delivery system, for delivery of articles between locations, the system comprising:

at least one UAV;

at each of at least two locations a secure zone for UAV landing and taking off;

a portal for receiving a request from a customer for a delivery of an article between two locations;

a computer platform, for checking on the status of the customer, and if the customer is in good standing, further executing a customer request.

In a further aspect of the disclosure, there is provided a method of delivering an article with an unmanned aerial vehicle (UAV) between two locations, and the method comprising:

receiving a request from customer to deliver the article between the two locations;

checking on the customer status, and if the customer is in good standing, executing the customer's request;

checking for the availability of a UAV at the departure location and the availability of the landing zone at the destination location, and further executing the customer request when these are available; and securing the article to the UAV and executing a mission to deliver the article from the departure location to the destination location.

In a further aspect of the disclosure, there is provided a method of planning a route for an unmanned aerial vehicle (UAV), the method comprising:

providing a plurality of locations, each of which may serve as at least one of a departure location including a departure zone and a destination location including a destination zone;

establishing a route network comprising a database of route sections connected between nodes at waypoints and UAV zones at the locations in the route network;

obtaining advance regulatory approval of the route network;

selecting a UAV to fly between two locations; checking the database for an existing flight path, comprising at least one route section, between the two locations suitable for the selected UAV; and when existing flight path is available, verifying the flight path.

In a further aspect of the disclosure, there is provided a flight route network comprising:

a plurality of UAV zones where UAVs can land and take off;

a plurality of way points and nodes at the waypoints;

a plurality of route sections providing connections between the nodes and the UAV zones, with each route section providing a connection between one node or one UAV zone and another node or another UAV zone; and for each route section, minimum and maximum altitudes, and a lateral width of the route section, wherein the route network has been subject to regulatory approval.

A further aspect of the present invention provides a method of establishing a flight route network, the method comprising:

identifying a plurality of UAV zones where UAVs can land and take off;

identifying and selecting a plurality of way points and defining nodes at the waypoints;

identifying and selecting a plurality of route sections providing connections between the nodes and the UAV zones, with each route section providing a connection between one node or one UAV zone and another node or another UAV zone; and for each route section, defining minimum and maximum altitudes, and defining a lateral width of the route section; and obtaining regulatory approval for the route network, whereby when a route is late selected that extends entirely over at least part of the route network, no further regulatory approval is required.

Further aspects and advantages of the embodiments described herein will appear from the following description taken together with the accompanying drawings.

BRIEF DESCRIPTION OF THE FIGURES

For a better understanding of the described embodiments and to show more clearly how they may be carried into effect, reference will now be made, by way of example, to the accompanying drawings in which:

FIG. 14A is an illustration of a New Order GUI;

FIG. 14B is an illustration of a Request Form GUI;

FIG. 14C is an illustration of a location status GUI;

FIG. 14D is an illustration of a asset management system GUI;

FIG. 14E is an illustration of a ticketing system GUI;

DETAILED DESCRIPTION

Figure 1:
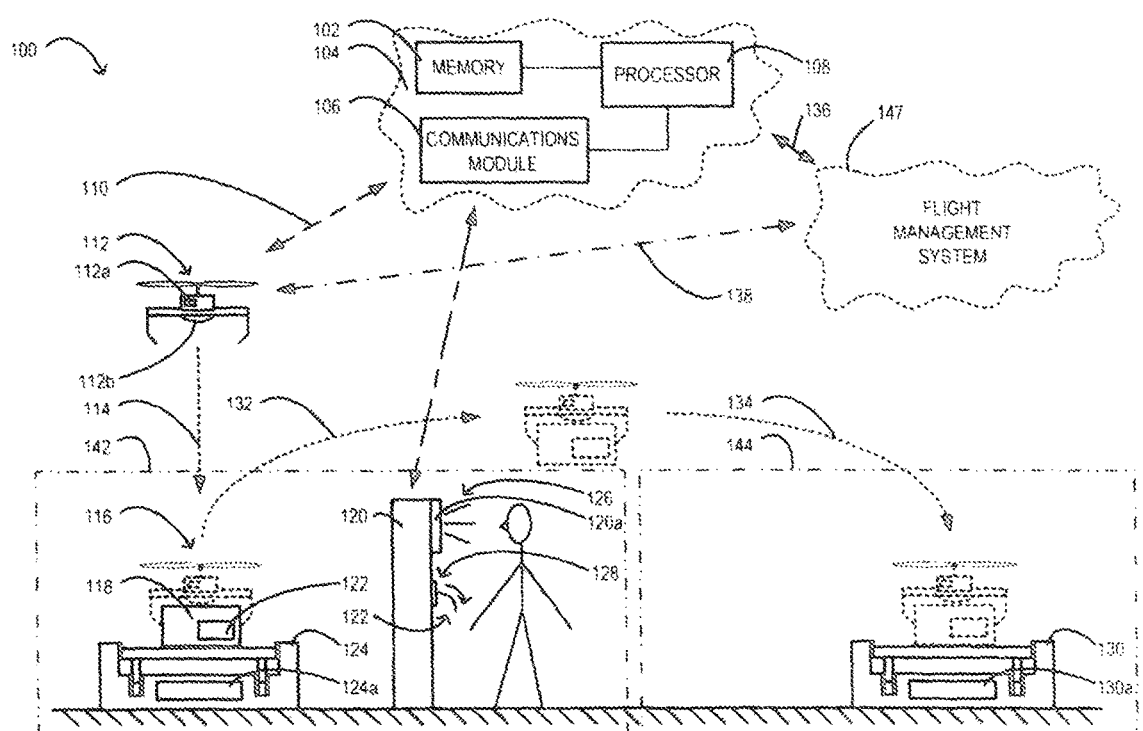
FIG. 1 is a schematic of an example Unmanned Aerial Vehicle (UAV) delivery system.

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

UAV DELIVERY SYSTEM OVERVIEW. Reference is now made to FIG. 1, which shows an unmanned aerial vehicle (UAV) delivery system 100 for use with a flight management system 147 for delivering articles 118 between at least a first party and a second party. Such articles 118 may be referred to as delivery articles 118. The first and second parties may include customers of at least one UAV delivery service. Customers may include, for example, manufacturers, shippers, distributors, or other businesses, and also government agencies. In some cases, customers may have UAV zones 142, 144 at one or more locations, such as locations related to the customers' business(es). A UAV delivery service provider may operate such UAV zones 142, 144 and allow for customers to send delivery articles 118 to and from each other by using UAVs 112 flying between the UAV zones 142, 144.

A UAV delivery service provider may operate such UAV zones 142, 144 by, for example, providing a UAV delivery system 100. As shown in FIG. 1, the UAV delivery system 100 may comprise: a) at least one computing system 104 having a non-transient memory 102 with executable instructions; b) a first UAV zone 142 assigned to a first party; and c) a second UAV zone 144 assigned to a second party. In some cases, the UAV delivery system 100 may also include at least one UAV 112. The flight management system 147 may be provided on the computing system 104.

UAV zones 142, 144 may include features and functionality as described in U.S. Provisional Patent Application No. 62/355,024 and a related utility patent application filed simultaneously with this application, the whole contents of which is hereby incorporated into this document by reference. The computing system 104 may be operable with the UAV zones 142, 144 to provide for UAV 112 deliveries of articles 118 between two or more UAV zones 142, 144—for example, between the first and second UAV zones 142, 144. In some cases, one or more customers may each have more than one UAV zone 142, 144 associated with them or which they may be authorized to use.

FUNCTION OF UAV ZONES. In one aspect, the first UAV zone 142 may be operable with the computing system 104 to provide for a takeoff 132 of a UAV 112 from the first UAV zone 142. The second UAV zone 144 may be operable with the computing system 104 to provide for a landing of the UAV 112 in the second UAV zone 144. The computing system 104 may be operable to enable the functionality of the UAV zones 142, 144, including the UAV zones 142, 144 as described in U.S. Patent Application No. 62/355,024.

FUNCTION OF THE FLIGHT MANAGEMENT SYSTEM. The flight management system 147 may control operation of UAVs 112 and may be provided by at least one of a third party and the UAV delivery service provider. Controlling operation of UAVs 112 may include determining UAV 112 availability to carry out one or more requested deliveries of articles 118, determining and arranging for servicing UAVs 112 such as the charging and possibly swapping power sources of UAVs 112, calculating and clearing (for example with one or more transport agencies) flight paths for particular delivery times, and other aspects required for UAV 112 operation. In some examples, the flight management system 147 may be operable to control any one, a combination, or all of UAV 112 takeoffs 132, landings 114, 134, and flights. In other examples, the computing system 104 may be operable with a given flight management system 147 to take over at least one of UAV 132 takeoffs and UAV landings 114, 134 at one or more UAV zones 142, 144 operated at least in part by using that computing system 104.

THE PORTAL. The computing system 104 may be operable with the instructions (which may be stored on the non-transient memory 102): a) to provide an article delivery portal, the portal being operable to receive at least one delivery request from a first party to deliver at least one article 118 from a first zone 142 to a second zone 144; b) to convert the delivery request into a UAV request; and c) to communicate the UAV request to the flight management system 147. In some examples, the UAV request may include at least: a UAV category request, a timeframe request, an article description, a flight start location, e.g the first zone 142, and a flight end location, e.g. the second zone 144. The article description may include a weight and a set of dimensions of the article 118.

The computing system 104 may be operable with the instructions to receive a response from the flight management system 147, to convert the response into a customer update, and to communicate the update to the portal. The response from to the flight management system 147 may be a response by the flight management system 147 to the UAV request from the computing system 104. The portal may be made available online for various users to access it via any suitable device, including mobile devices such as smart phones. In any case, the portal may include a graphical user interface (GUI).

PORTAL MAY BE PROVIDED VIA A TERMINAL. In some embodiments of the UAV delivery system 100, the portal may be provided via a terminal 120. In one example, the terminal 120 may be weather-proof and may comprise at least one display 120a. The display 120a may be operable to display the GUI. In some examples, the display 120a may include a touch-screen operable to allow a user to input information via the GUI of the portal. In some examples, the terminal 120 may include a keyboard. The portal may be operable to receive communications such as customer updates. In embodiments where the portal may be made available via a terminal 120 having a display 120a, the display 120a may be operable with the portal to display the communications.

TERMINAL MAY INCLUDE A PRINTER. In another aspect, the terminal 120 may include a printer 128. In some examples, the printer 128 may be integral with the terminal 120 and may be operable to print various types of information and labels 122. In some embodiments the printer 128 may be operable to make printouts on a material comprising at least one of paper and plastic and comprising a side having an adhesive protected by a removable layer. Depending on the embodiment of a UAV zone 142, 144, one or more terminals 120 may be provided within, at, or in proximity to the UAV zone 142, 144. The terminal and any other associated computer or electronic equipment may be provided inside a building or otherwise protected from the elements.

RESPONSE TO RECEIPT OF DELIVERY REQUEST. The computing system 104 may be operable to, in response to receiving an order or other request to deliver at least one article 118 from a first UAV zone 142 to a second UAV zone 144, access at least one database to ascertain whether it is possible to effect the delivery within at least one set of parameters defined for the delivery at least partially by the party with which the order or request was originated (for example, the first party). The delivery parameters may include, for example, delivery article 118 dimensions and weight, a designation of the article 118 as being standard or fragile, and a desired delivery timeline. The database may store information such as real-time UAV 112 availability and may include real-time information feeds from at least one of: the first UAV zone 142, the second UAV zone 144, a government agency such as a transport agency, a weather database, and the flight management system 147. In one example, the flight management system 147 may be operable to generate real-time UAV 112 availability data and the computing system 104 may be operable to receive this data in at least one of: real-time, near-real-time, and at predefined time intervals.

UNIQUE IDENTIFIERS. The computing system 104 may be operable with the executable instructions to generate a unique identifier for a delivery article 118, to communicate the unique identifier to the portal for access by the first party, and to provide an instruction to the first party via the portal to print 128 and attach a hard-copy 122 of the unique identifier to the article. In examples where the portal includes a terminal 126 and where the terminal 126 includes a printer 128, the printer 128 may be operable to print hard-copies of unique identifiers, e.g. bar code or matrix code, such as a QR code.

The computing system 104 may be operable to generate a unique identifier for a given delivery article 118 by analyzing the delivery parameters of that article 118 against data from the at least one database, assigning the article 118 to a given UAV 112 such as the at least one UAV 112 (in some examples, to a given UAV 112 out of a set of available UAVs 112), generating a resulting dataset, and generating the unique identifier such that it comprises the dataset. In a further aspect, a given UAV 112 may have a label to enable a user to identify the UAV 112 and distinguish the UAV 112 from other UAVs.

A UAV MAY HAVE A SENSOR AND COMMUNICATIONS MODULE. In embodiments where the UAV delivery system 100 comprises at least one UAV 112, the UAV 112 may have at least one sensor and at least one communications module, and may comprise a display and/or keypad or input device 112a. The sensor and communications module may be in communication with a processor and may be operable with the processor to: a) read a unique identifier (in one example, by scanning a hard-copy unique identifier), b) generate a validation signal corresponding to the unique identifier, and c) communicate the validation signal to the computing system 104. At least to minimize physical interaction with the UAV while permitting a user to receive data from and transmit data to the UAV, the UAV, alternatively, may include as part of the communications module, wireless communication, such as Bluetooth to a user's handheld or other device. The processor may be onboard the UAV 102 and may be a remote processor (i.e. external to and lacking physical attachment to the UAV), such as a processor in a cloud-based computing system, in communication with the communication module of the UAV 112.

A USE OF THE VALIDATION SIGNAL. The computing system 104 may be operable to analyze the validation signal in order to ascertain that the delivery article 118 bearing a given unique identifier has been attached to, linked with, or inserted into (depending on the article-retention mechanism of each UAV 112) the UAV 112 assigned to that article (as opposed to a UAV that has not been assigned to that article).

The computing system 104 may be operable with the executable instructions to validate the validation signal and generate a corresponding result, to generate a set of user-instructions based on the result, and to display the set of user-instructions via a display 112a of the UAV 112 to which the article 118 has been attached, linked, or into which the article 118 has been inserted (as applicable, depending on UAV configuration). The set of user-instructions may include at least one of: a) an instruction to reduce the weight of the article 118 by a stated amount, b) an instruction to assign the article 118 to a stated UAV 112, and c) an instruction to position the UAV 112 on a stated UAV zone 142, 144.

DISPLAYING MESSAGES ON A UAV. Depending on the corresponding result, the computing system 104 may be operable to generate and display a confirmation message via, for example, a display 112*a* of the UAV 112. The computing system 104 may be further operable to generate and display an error message via the display 112*a* to indicate that the UAV 112 is an incorrect UAV 112. The computing system 104 may be further operable to, concurrently with generating the error message, generate a halt-flight signal for the incorrect UAV 112 and transmit this signal to the flight management system 147 that may be in charge of that UAV 112 during at least a portion of the delivery to be effected by that UAV 112.

Figure 2:
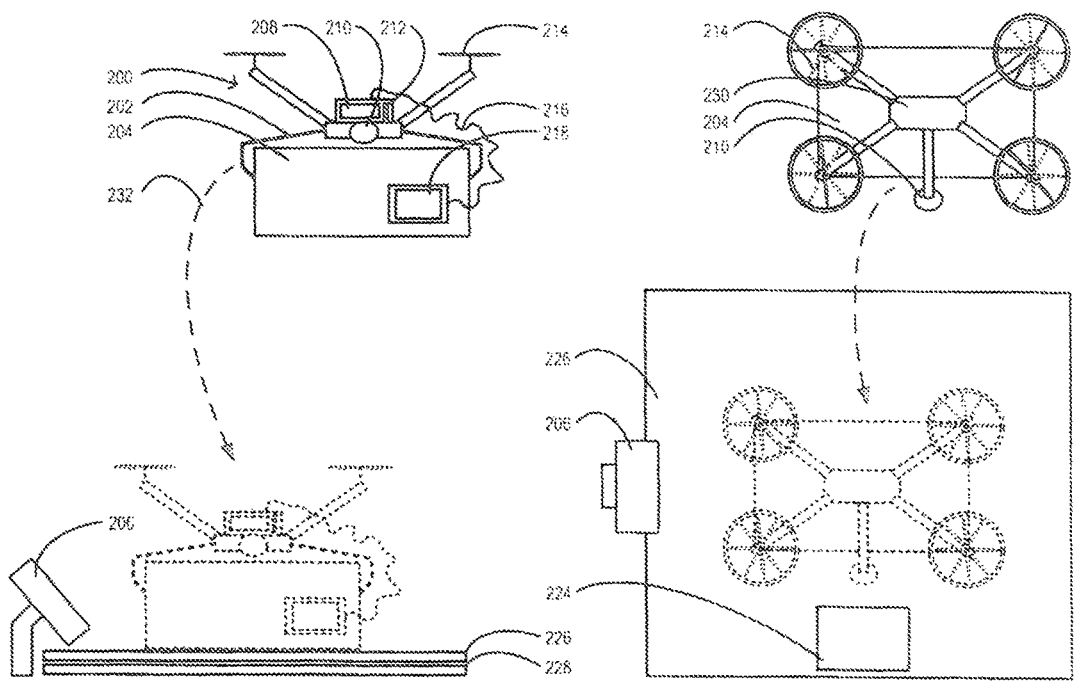
FIGS. 2A and 2B are side view and plan view, respectively, schematics of an example UAV pad for an example UAV, according to one embodiment.

WEIGHT-SENSITIVE UAV PADS. Reference is now made to FIG. 2. One or more UAV zones 142, 144 may include at least one UAV pad 226 for at least one of UAV takeoffs and landings. In some cases, one or more UAV pad 226 may include a weight sensor and may be operable to measure a weight exerted on the UAV pad 226. The UAV pad(s) 226 may have features and functionality as described in U.S. Patent Application 62/355,024. UAV pad(s) 226 may further comprise an identifier-device 206 operable to read unique identifiers including the unique identifiers described above.

QR CODES AND IDENTIFIER-DEVICE. In some cases, unique identifiers may include one or more Quick Response (QR) codes. In such cases, the identifier-device 206 may include a QR code reader operable to read the QR codes to extract the dataset(s) that may be embodied in the QR codes, and to communicate the dataset(s) to at least one of the computing system 104 and the flight management system 147. In one example, an identifier-device 206 may be arranged with a given weight-sensitive UAV pad 226 such that the identifier-device 206 may automatically read a QR code attached to an article 118 in response to the article 118 being placed onto the UAV pad 226.

SAFETY INTERLOCK: UAV-ARTICLE-PAD. The computing system 104 may be also operable to, in response to receiving one or more dataset from a QR code read by the identifier-device 206, receive a weight reading (indicating, for example, the combined weight of an article 118 and a UAV 112 carrying that article 118) from the UAV pad 226 associated with that identifier-device 206, correlate the dataset with the validation signal that may be received from the UAV 112 and thereby determine: a) whether the UAV 112 is the UAV 112 assigned to carry that article 118, b) whether the UAV 112 and article have been positioned on the correct UAV pad 226; and c) whether the combined weight of the article 118 and the UAV 112 is within a gross weight limit associated with the UAV 112. The computing system 104 may be operable to, depending on the result of the determination, generate one of a go-flight signal and a halt-flight signal for that UAV. The computing system 104 may also be operable to communicate this signal to the flight management system 147.

UAV ZONE UAV-POSITION SENSOR. In some cases, one or more UAV zones 142, 144 may each include at least one sensor operable with the computing system 104 to determine when a UAV 112 has been positioned on the UAV zone 142, 144. The computing system 104 may be operable to request a confirmation from a user such as the first party that the user has readied the UAV 112 for takeoff 132. In some examples, the at least one sensor may include a weight sensor. In some examples, the weight sensor may be a weight sensor of a UAV pad 226.

USER AUTHENTICATION INTO PORTAL. Users of the UAV delivery system 100 may be authenticated to use one or more UAV zones 142, 144, depending on, for example, a subscription of that user. A GUI made available to a user, possibly after requesting a user access code and receiving a satisfactory access code from a user (such as at least one of the first party and the second party), via the portal may be operable to provide an information screen populated with information pertaining to one or more UAV zones 142, 144 that the user may be authenticated to use.

DISPLAYING INFORMATION VIA THE UAV. In embodiments of the UAV delivery system 100 that include at least one UAV 112, and as described above, the UAV 112 may have a UAV display 112*a* operable to display information. The information may include user-instructions, metrics associated with the UAV 112 such as a current battery level, a date and possibly time for a next scheduled maintenance, and other information such as current weather and weather forecasts at one or more UAV zones 142, 144.

In some embodiments, the display 112*a* may be operable with the computing system 104 of the UAV delivery system 100 to display a video feed from one or more UAV zones 142, 144, such as a delivery destination UAV zone 144. The one or more video feeds may be configured to display a condition of the UAV zone(s) 142, 144 corresponding to each feed.

LANDING IDENTIFIER. In a further aspect, one or more UAV zones 142, 144, may include a landing identifier 224. UAVs 112, including the at least one UAV 112 that may in some cases be part of the UAV delivery system 100, may be operable with at least one of the computing system 104 and the flight management system 147 to identify the landing identifier 224 at least during an approach 134 of a given UAV 112 to a given UAV zone 142, 144, and to land at or in proximity to the landing identifier 224. The flight management system 147, while shown separately may be provided on the computing system 104. The landing identifier 224 may be any suitable identifier recognizable by UAVs 112 operable to identify and land at the identifier. In yet a further aspect, the pad 226 of each of the one or more UAV zones 142, 144 may be a portable The portable pad 226 may include the landing identifier 224.

Alternatively, for some destination locations, it may be preferred or possible to avoid landing the UAV 112. Instead, the UAV 112 may hover over the UAV zone 144 at a destination, and lower a delivery article by a cable or the like. This can simplify the requirements of the landing zone at the destination, which then does not have to provide for an actual landing of the UAV, but only for landing of the delivery article.

At both delivery and destination locations, the UAV zones may be provided on a moving vehicle or otherwise be movable. For example, the vehicle could be a truck with a flat bed, a railway car, or on a ship. At least for delivery, the UAV 112 may not need to actually land, but could hover while an article is delivered by a cable or the like, as mentioned above. Where the UAV does not land, a camera is activated to film or photograph the delivery, as proof of delivery.

LANDING VIA COMPUTING SYSTEM. The computing system 104 may be operable with the executable instructions to perform at least a landing 134, 232 of a UAV 112 at a UAV zone 142, 144. Such a UAV zone 142, 144 may include the identifier device 206 operable with the computing system 104 to detect an approach and landing 134 of the UAV 112 and to record a video of the approach and landing 134. In a further aspect, a UAV 200 may include at least one sensor 210 operable with the computing system 104 to detect an approach to and landing of the UAV 200 at a UAV zone 142, 144, and to record a video of the approach and landing. For this purpose, the UAV 112 may have a sensor for identifying the landing identifier; e.g. if the landing identifier is a QR code, then the UAV 112 may have a camera, QR reader, etc. A video sensor (camera) on the UAV can record footage while the UAV is in flight to create a proof of delivery document.

MONITORING ARTICLE SAFETY. In embodiments where the UAV delivery system 100 comprises at least one UAV 112, 200, the UAV 112, 200 may be operable to engage at least one delivery article 118, 204 and may include at least one sensor 218 mountable to the delivery article 118, 204. The sensor 218 may be operable with at least one of the computing system 104 and a processor associated with that UAV 112, 200 to sense at least one of: a) forces applied to the delivery article 118, 204, and b) acceleration of the delivery article 118, 204.

The computing system 104 may be operable with the executable instructions to perform at least one of: a) provide for the viewing, for example via the portal, of the forces and acceleration applied to the at least one delivery article 118, 204, in at least one of: real-time, near real-time, and at custom time intervals; b) record a time plot of the forces and acceleration and provide the time-plot for at least one of review and download, for example, via the portal; and c) identify a maximum force and a maximum acceleration in the forces and acceleration, respectively, and provide the maximum force and acceleration for at least one of review and download, for example, via the portal.

PLOTTING FORCES AND ACCELERATION. In a further aspect, the computing system 104 may be operable to determine at least one safe range of the forces and acceleration that may be applied to, and to provide the range for at least one of: review, download, and analysis via, for example, the portal. In one example, the computing system 104 may be operable to plot a history of forces and acceleration applied to the at least one delivery article 118, 204 against the at least one safe range of the forces and acceleration. In one aspect, the computing system 104 may be operable to determine and indicate to a user (such as a customer), for example via the portal, times at which and the magnitudes by which at least one of the forces and acceleration applied to the delivery article 118, 204 during the article's 118, 204 delivery may have exceeded a safe range.

DOCUMENTING SAFE DELIVERY. In some implementations of the UAV delivery system 100, it may be desirable to record at least one form of proof of at least one aspect of the delivery of the delivery article 118, 204. In some examples, a UAV zone 142, 144, may include at least one identifier device 206 operable with the computing system 104 to detect and record an approach and landing 134, 232 of a UAV 102 at the UAV zone, and to record a video of the approach and landing 134, 232.

AN EXAMPLE METHOD. An example of a method for providing a UAV delivery service is described next.

Figure 3:
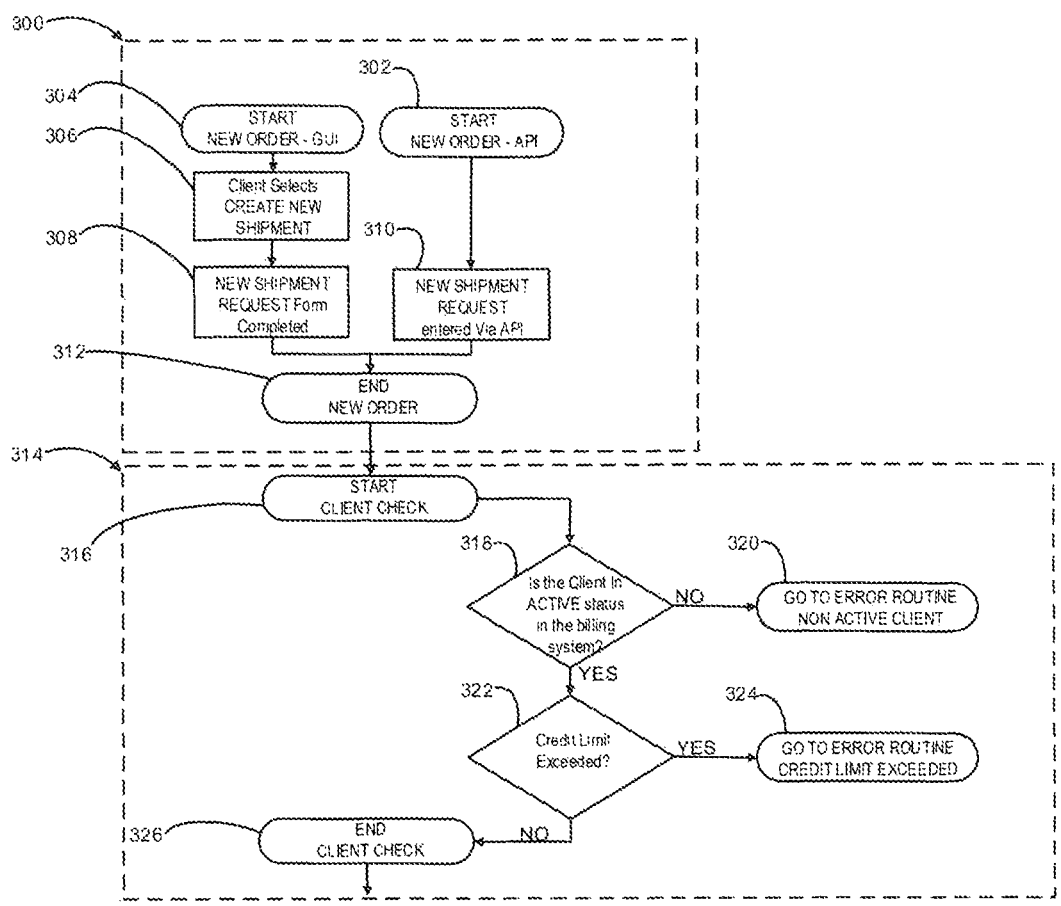
FIGS. 3 to 11 are flow charts showing workflow for a delivery between locations.

GUI AND NEW ORDERS. Reference is now made to FIG. 3. The example method may include providing at least one of New Order GUI 304 and a New Order Application Programming Interface (API) 302, each 302, 304 being operable to allow a client to create an article shipment request 306 to be effected by a UAV delivery service. Commonly each of the API 302 and the GUI 304 will be provided on a computer or handheld device of the customer or client. Information to be provided by the client may include: departure location; destination location; weight and dimensions of article; nature of shipment; requested delivery time; speed of delivery (e.g. 'regular', 'rush', etc.) This step may include a step of providing a Request Form 308 via the GUI/API 302, 304 to be completed by the customer, and receiving 312 the completed form from the customer.

The example method may also include providing a system operable to effect a client check step 314 at which the system may check the status of the client 316 by, for example, verifying whether the client is active 318 in a billing system (not shown) associated with the UAV delivery service, and whether a credit limit has been exceeded 322 by the customer. Where a result of this step includes an indication that the client is inactive, has exceeded a credit limit, or is otherwise a risky client, the method may include initiating a corresponding error routine 320, 324 which may prevent that client from proceeding with the shipment request 306. The client check step 316, 326 may be implemented iteratively to monitor and determine when the condition(s) 318, 322 that may have initiated the error routine no longer exist(s). Checking the client credit limit can include checking that funds available in a client account are sufficient to cover a proposed delivery. The client will be advised if there is insufficient credit/funds available and give options to remedy the deficiency.

In real time, the client can be given cost quotes for delivery in different time frames; e.g. as for other services, rates and costs can be adjusted depending upon the demand at different times, and the rates themselves can be continually adjusted. For example, if bad weather or other factors causes a backup in deliveries, then rates can be increased, to encourage clients to choose a later delivery time, when the demand will be less.

Figure 4:
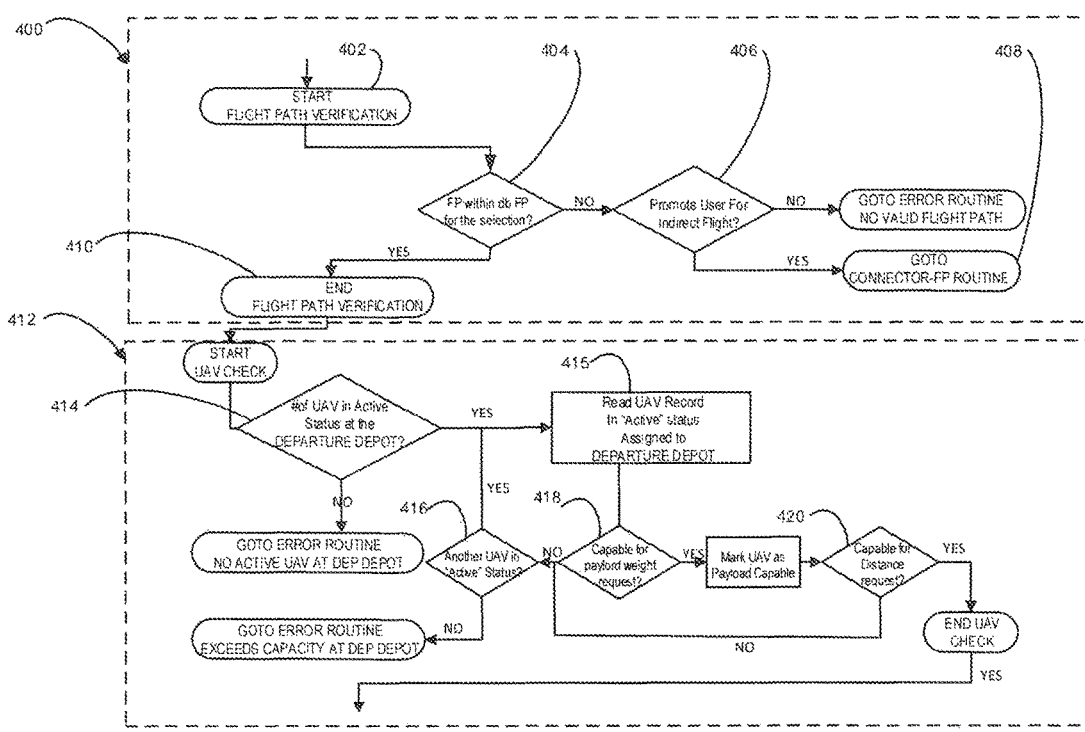

As illustrated in FIG. 4, the method may further include a flight path selection step 400. In some embodiments, flight paths for UAVs may be generated by the flight management system 147. In other embodiments, such as for example where the method includes a step of delivering an article between UAV locations, the method may include maintaining a database storing a plurality of possible flight paths between the UAV zones. The flight path selection step 400 may include verifying whether a flight path is available 402 between two or more locations, such as UAV locations selected by the client as start and end locations for the delivery of the article. In one example, the step may include searching the database 404 for an acceptable pre-determined flight path.

Where no acceptable flight path has been found or generated, the method may include a step 406 of prompting the client whether they wish to request at least one of: a) a custom manual plotting of a flight path by a UAV delivery service operator, and b) an indirect flight path that may include stops at intermediate locations such as additional UAV zones, as indicated at 408. Where the client selects a manual flight path option, the method may include relaying information regarding the article shipment request 306 to a UAV delivery service operator and monitoring for a response from the operator. The response may include a manually-created flight path customized for the particular article shipment request 306.

Where an acceptable flight path has been ascertained 410 or a manually-created flight path has been received 408, the method may proceed by initiating a UAV check step 412. This step 412 may include a check 414, 416 of how many UAVs are in active status at the location, such as a UAV location selected by the customer as a departure location for the shipment. At 415, a UAV record in active status may be read. Where one or more UAVs are active at the location, the method may proceed by querying 418 whether one or more of the UAVs is capable of delivering the article according to a set of shipment request parameters. In some examples, the parameters may be defined by a UAV delivery service provider. In other examples, the parameters may be defined at least in part by the client.

The method may include a step 418 of measuring the article's weight in order to enable the step of determining whether one or more of the UAVs is capable of delivering the article. In one example, this step 418 may include checking whether the UAV is capable of carrying the weight and dimensions of the article, and whether the UAV is capable of carrying the article across a required distance 420. Shipment request parameters may include a weight of the article, a delivery distance, and a delivery timeframe.

Figure 5:
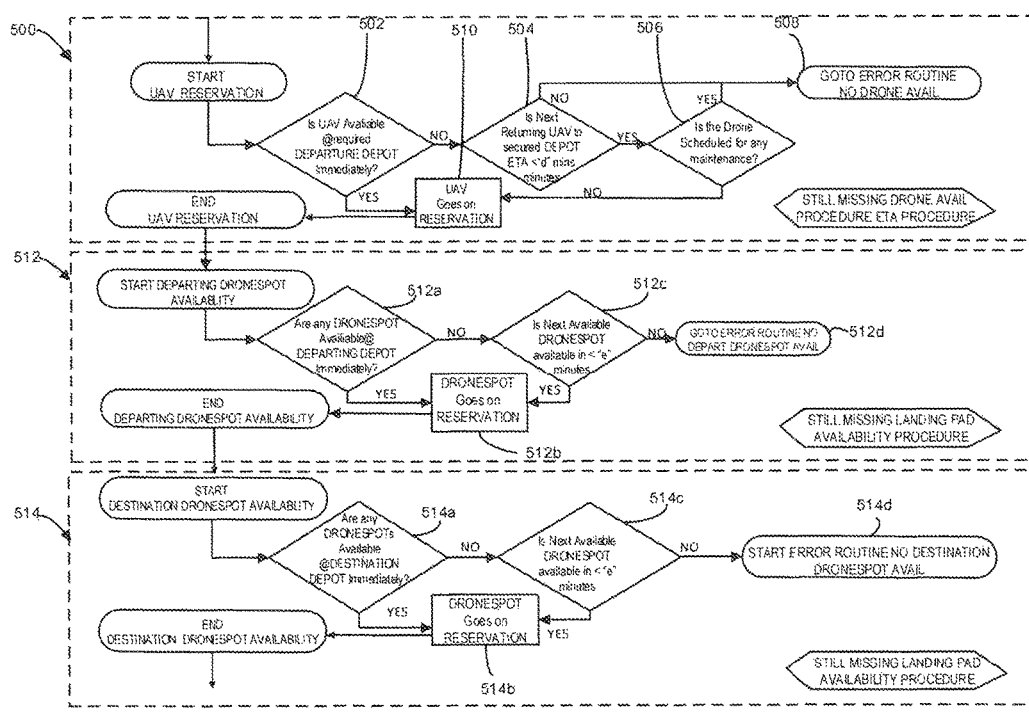

As illustrated in FIG. 5, where at least one UAV is available at the start location and is capable of delivering the article, the method may proceed with a reservation routine 500 to reserve the at least one UAV for that article shipment request 306. The method may also include a step of determining whether the UAV is available to start the delivery (i.e. takeoff) immediately 502. Where no UAV is available immediately, the method may proceed by determining whether a UAV, such as a UAV scheduled for the next-earliest arrival at the location, may become available at step 504, to effect the requested article shipment within a preset timeframe.

The method may also include, when at least one UAV is available either immediately or in the preset timeframe, a step of verifying whether a selected UAV is scheduled for maintenance 506. Where the step results in an indication that the UAV is scheduled for maintenance, the method may, at step 508, unassign the UAV from the article shipment request 306 and check whether at least one other UAV is available and suitable. In another implementation, the method may check for availability, capability, and maintenance of a UAV prior to assigning the UAV to a shipment request.

The method may include providing a location for UAV takeoffs. In one example, the method may include providing a UAV zone or location as described above and in U.S. Application No. 62/355,024. Accordingly, after a UAV has been assigned 510 to a shipment request 306, the method may proceed to a departure zone availability routine 512, to determine whether a UAV zone is available to provide for the UAV's takeoff at a time suitable for the requested shipment. A suitable time may include at least one of a requested time and a time at an acceptable delay after the requested time.

The departure zone availability routine 512 first checks at 512a, for any available UAV zones for departure. If one is available, then it is reserved at 512b and the method moves the next step. If one is not available, then the method checks at 512c to see if one will be available in a predetermined time period, for example within a certain number of minutes. Again, if a UAV will become available within that set time, then it is reserved; if not, then the method goes to further routine 512d, to indicate that no departure zone is available.

With a departure zone identified and reserved, the method continues with a destination zone availability routine 514, checking for the availability of a UAV zone at the destination location, as indicated at 514a. Correspondingly, if one is available, it is reserved, at 514b Availability may be determined not in terms of immediate availability, but rather availability within a time period around the UAVs expected arrival time. Thus a method only needs to block off a period of time at the destination zone that allows for small variations in the arrival time, and sufficient time for an article to be retrieved from the UAV and the UAV to depart from the destination location. Where the availability determination for either of the departure or destination zones determines that there will be some delay before a zone will become available, than correspondingly an adjustment will need to be made for the requested availability at the other location; for example, if a departure zone will not be available for 30 minutes, then the time period for arrival of the UAV at the destination location will similarly need to be put back by 30 minutes. If not destination zone is available immediately, as indicated at 514c, a check is made for one becoming available within a set time, and if one is not available, then the routine continues at 514d to provide that indication.

Figure 6:
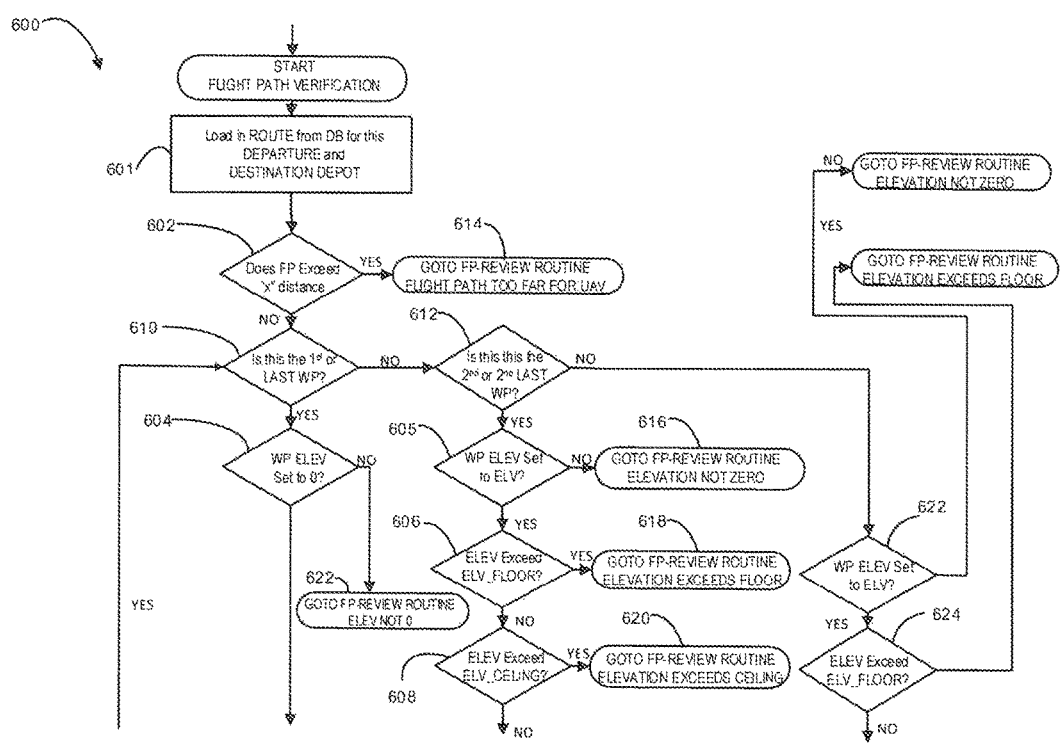
Figure 7:
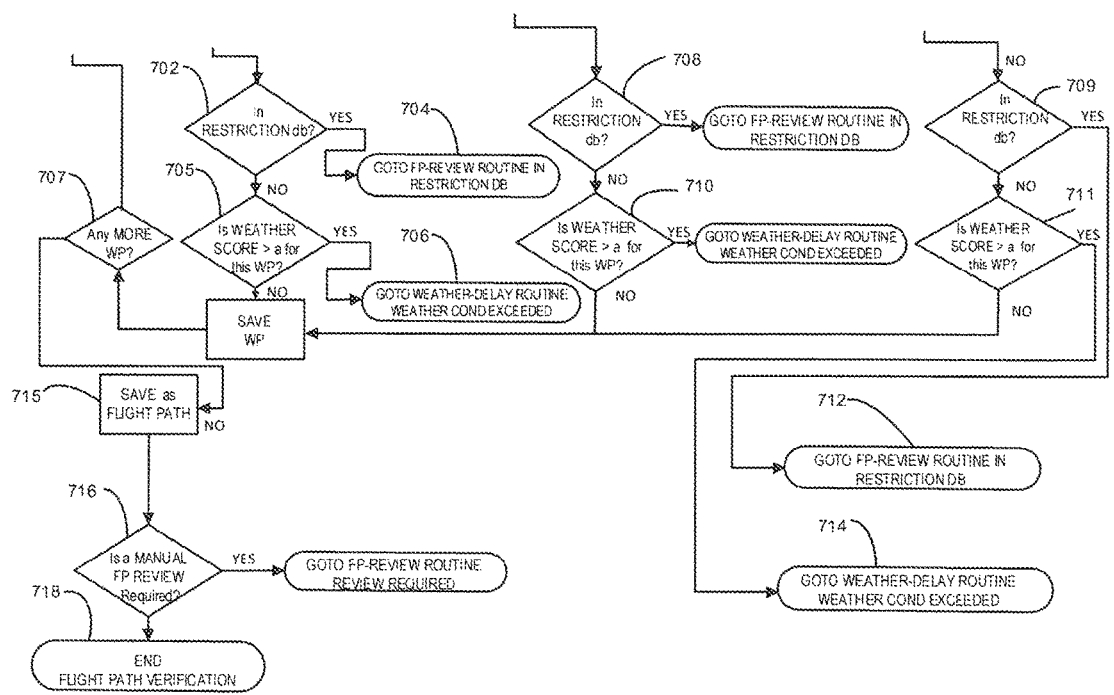

As shown in FIGS. 6 and 7, following the determination that UAV zones are available for departure and for the destination, the method can proceed to determine a flight path for the proposed flight. It is expected that, for each jurisdiction, a blanket or general license will be granted for a pre-approved route network comprising a number of route sections interconnected at nodes. Where the departure and destination zones are at nodes in the route network, it will generally be possible to determine a flight path by selecting appropriate route sections. An algorithm can be provided for this purpose, which can select route sections based on a number of parameters, such as: shortest route; level of traffic on different route sections; and wind and other weather factors. Provided a fight path can be determined from a suitable selection of route sections from the route network, then no further approval will be needed. In general, it is expected that flight paths will need to be created by selection of flight sections from the approved route network, and it will not be possible to select some arbitrary routing. In the case where a flight path is entirely or partially (i.e. it uses some route sections of the approved route network, but requires some additional route sections outside of the network), then this may require separate regulatory approval. It is expected that this often may be time consuming and may lead to delays, so as to be avoided if possible; e.g. ensure that both the departure and destination locations are on the route network.

Thus, the method then proceeds to a flight path verification routine 600. The flight path verification routine 600 may include checking whether the selected flight path for the article shipment fits within the range of acceptable parameters. As a first step 601, the method checks for an available predetermined route in a route database, between the departure and destination locations, and if available, loads this route. If a route is not available, then the client is advised accordingly.

At 602, a check is made for whether the selected flight path exceeds a predetermined distance, which can be calculated depending upon the type of UAV used, weight of article, weather conditions, available battery life and other factors. If the flightpath does exceed this preset distance, then at 614, the method goes to a review routine. One option would be to split the flight path into two segments with the UAV stopping at one or more intermediate locations where, for example, one or more batteries can be replaced or recharged.

Assuming a distance is acceptable, then at 610, method checks the waypoints along the route, the waypoints being nodes between at the ends of route sections. For the first and last waypoints on the route, the method goes to step 604, to check that the waypoint elevation (WP ELEV) is set to zero, as the UAV should be at ground level at the first and last waypoints. Again, if WP ELEV is not set to zero, then at 622, the method goes to a review routine. If the WP ELEV is set to zero, then at 702, a check is made whether there is any restriction for the waypoint in the database. If there is a restriction, then at 704, the method goes to a review routine. Assuming there is no restriction, the next step at 705 is to check a weather score. If the weather score is greater than a predetermined value for that waypoint, the method goes to a review routine at 706. Assuming the weather score is acceptable, i.e. it is below the preset value, then method saves the waypoint, and at 707 checks for any more waypoints, returning the method to 610.

At 610, if the waypoint is other than the first or last waypoint, the method goes to step 612, which checks for the second or second to last waypoint. If the waypoint is second or second last waypoint, then at 605, 606, 608, 708 and 710 a sequence of checks is carried out, similar to those for the first and last waypoints. At 605, a check is made that the WP ELEV is set to ELV, a required elevation. If not, then at 616, the method goes to review routine. If the elevation is acceptable, then at 606 and 608, checks are made that ELV is, respectively, above ELV_FLOOR and below ELV_CEILING. If these limits are not met, then at 618 and 620, the method goes to review routine. At 708 and 710, checks are made that the waypoint is not in a restriction database and that the weather at the waypoint does not exceed a permitted score. If these checks are cleared, then the waypoint is saved.

For all of the waypoints, the method at 622 checks that WP ELEV is set to ELV and that the elevation ELEV exceeds ELV_FLOOR. As for other waypoints, at 709 and 711, checks are made that the waypoint is not in a restriction database and that the weather score for that waypoint does not exceed a preset score for that waypoint.

Once it is determined at 707 that all waypoints have been reviewed, then the method saves the flight path as indicated at 715. At 716 a check is made whether a manual flight path review is required. If yes, then the method goes to review routine; if no flight path review is required than at 718 the flight path verification is ended.

Figure 8:
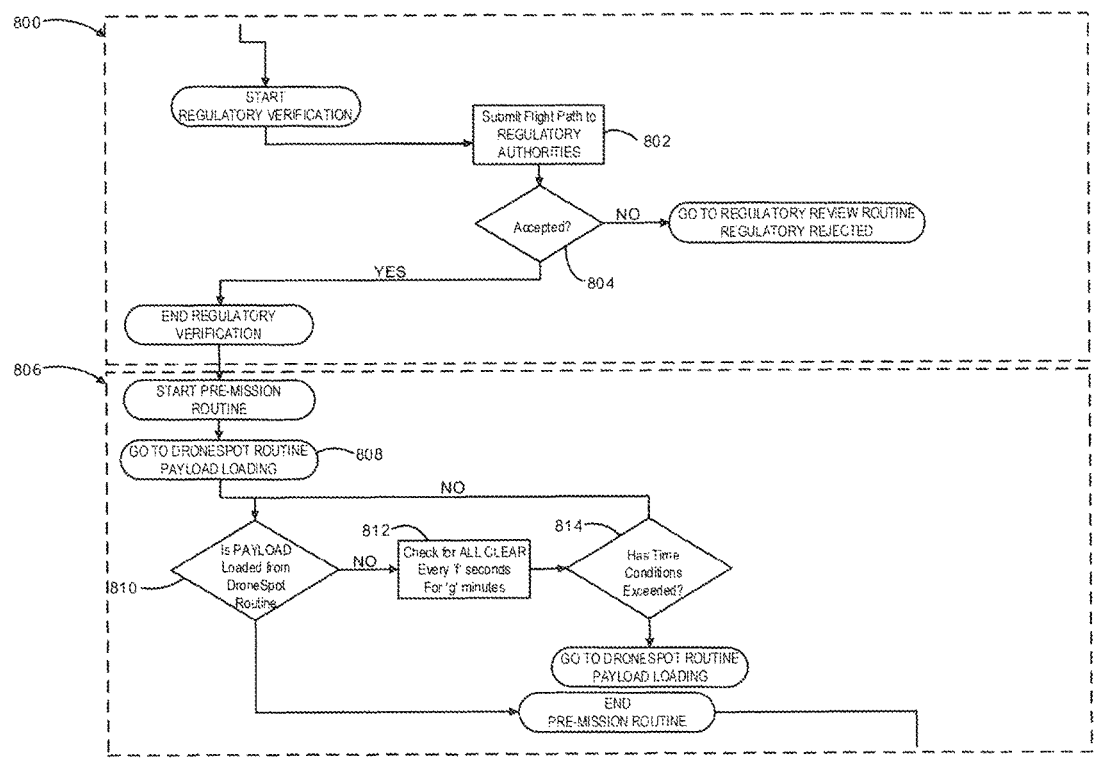
Figure 9:
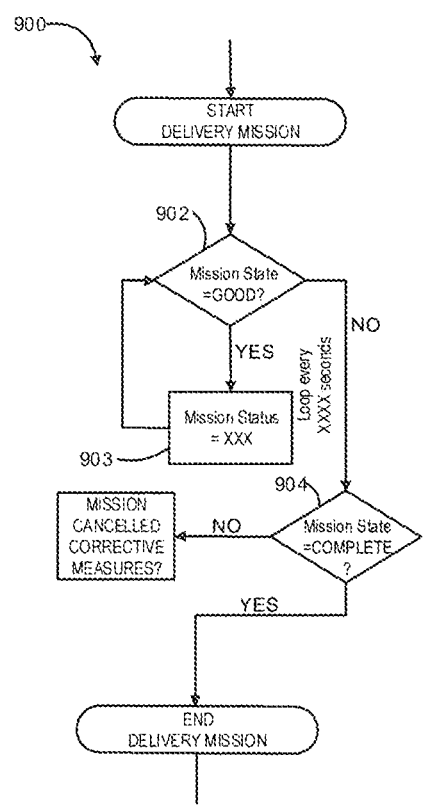
Figure 10:
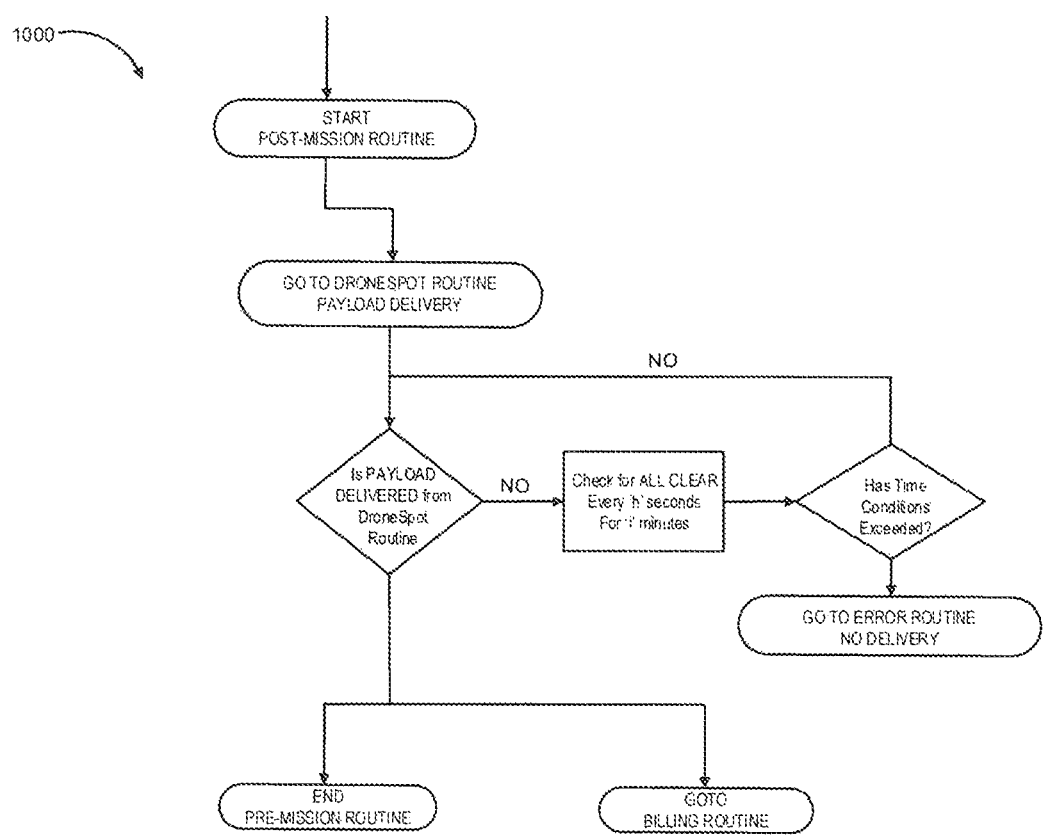
Figure 11:
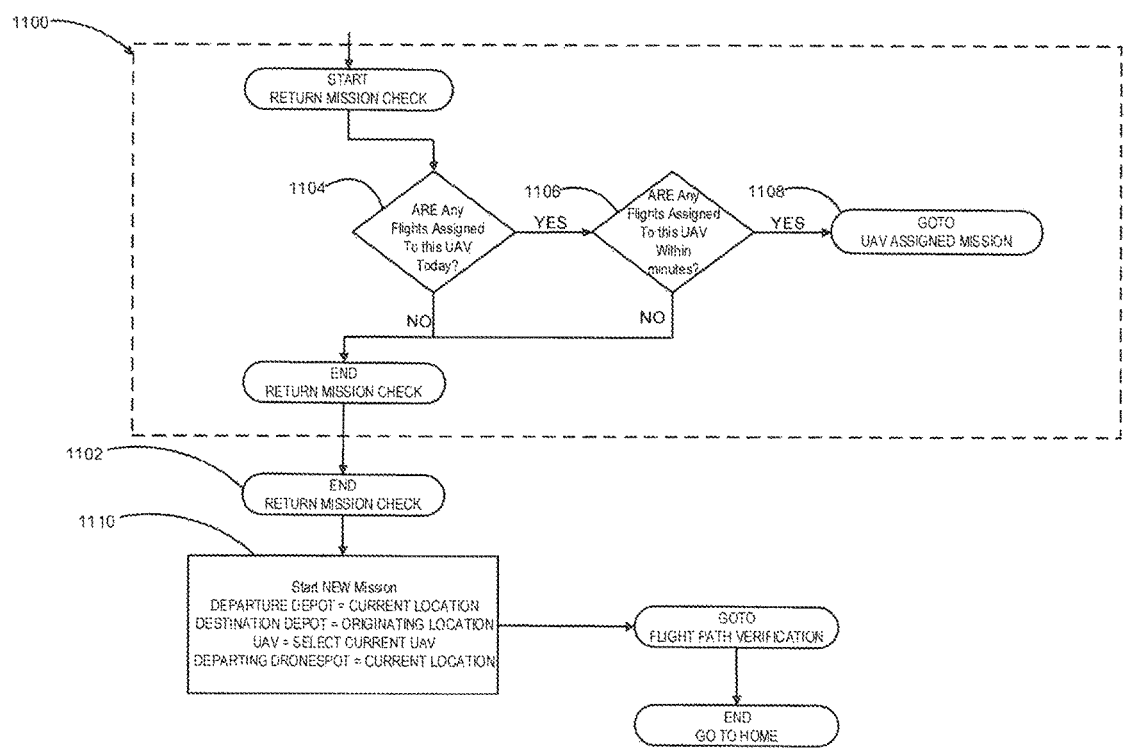

Reference is now made to FIG. 8. As shown, the method may include a routine 800 of submitting the selected flight path to a regulatory body for authorization.

At 802, the flight path is submitted to regulatory authorities. As indicated at 804, if it is accepted, then the regulatory verification ends. If not, then the flight path is submitted to a review routine, for review of the flight path. Where the flight path has been selected from a predetermined flight path database, or is comprise of approved route sections from a database, then these will already have regulatory approval, so further approval will not be required. Where any part of the route has been manually inputted or is otherwise not in the database of approved routes/route sections, then separate regulatory approval may be needed. It is possible that a blanket regulatory approval may be obtained for certain changes to an approved routed. For example, if the changes are limited by certain parameters, e.g. if the length of the not previously approved route change or addition is below a set limit, then separate regulatory approval may not be required. It is possible that any elements of a flight path that are not route sections in a database will be one or both of: a portion of the route from a departure location; and a portion of a route to the delivery location.

At 806, a pre-mission routine is effected. This includes, at 808, checking a routine for payload loading at the UAV departure location, which could be in accordance with that detailed into the application 62/355,024. At 808, a check is made that the payload has been loaded from that other routine. If loaded, the pre-mission routine is ended; if not, a check is made regularly for some period of time, as indicated at 812. If the time is exceeded, as indicated 814, then the routine goes to an error routine.

Additional checks that may be carried out are:

(a) weight verification against the landing zone to ensure that the TARE/GROSS weight is now showing that the parcel has been removed, and there is no new parcel loaded into the UAV;

(b) the battery power system is within specifications to execute a mission; and (c) the GPS signal is within limits and has clear signal.

With all these checks cleared, the method then provides for effecting the delivery mission or making the delivery of the article as indicated at 900, by initiating a takeoff of the UAV with the article. The progress of the UAV is monitored at 902 and the mission status updated at 903, and this can include details of the location of the UAV.

In some embodiments, step 902 includes initiating a communication request from the UAV. The communication request may be a GET request, transmitted securely over a TLS (i.e. https) link created using known methods. The communication request may include a unique authentication code associated with the UAV, and/or a serial number associated with the UAV.

Figure 12:
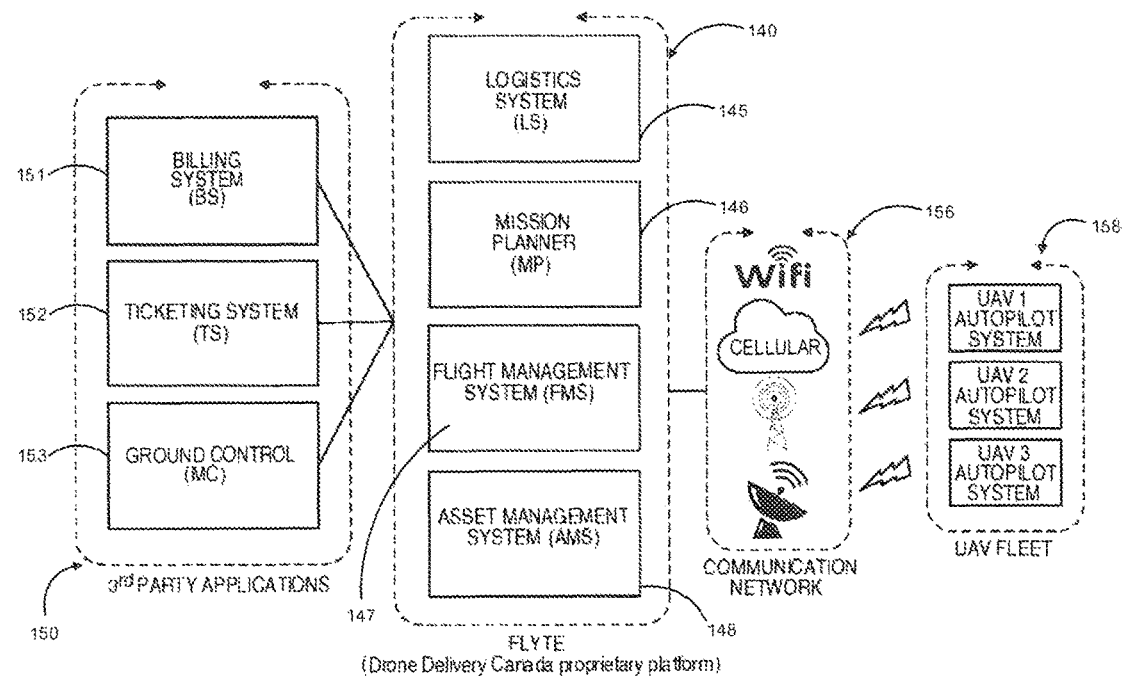
FIG. 12 is a schematic diagram of a flight management platform, third party applications, communication network and UAV fleet.
Figure 12A:
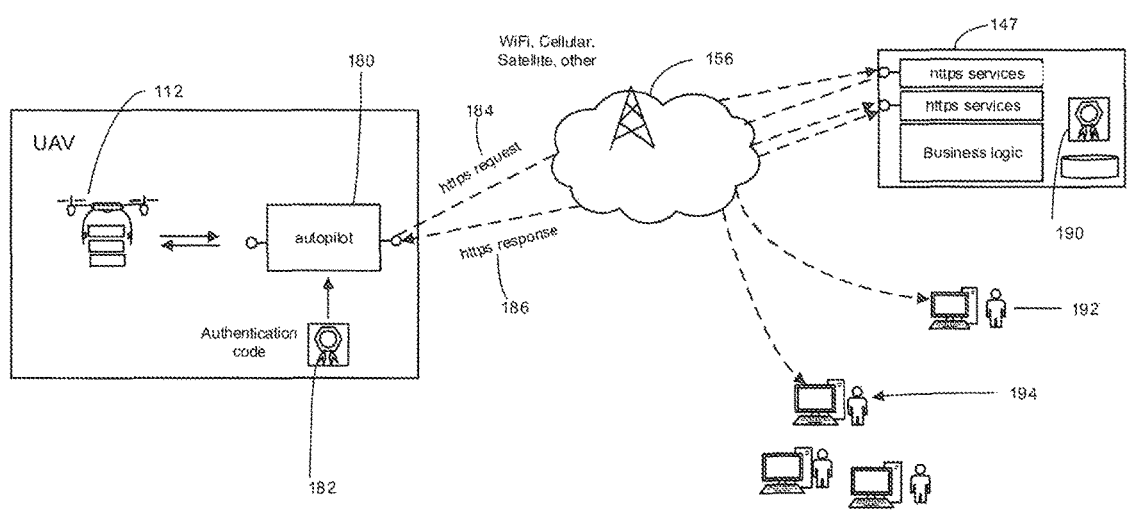
FIG. 12a is schematic diagram of an alternative arrangement to that shown in FIG. 12.

FIG. 12*a* shows further details of an alternative communication scheme. Here a UAV 112 is shown as including an autopilot 180 provided with the unique authentication code shown at 182. Secure requests and responses may be sent through a form of communication 156 (detailed in FIG. 12) are indicated at 184, 186, and as shown, these are further connected to secure services 188 of a flight management system 147 (detailed below), which can include an authentication code 190. An administrator 192 for the flight management system 147 and users or customers 194 are also indicated.

The communication request may be formatted based on a lightweight message format, such as the Micro Air Vehicle Link protocol ("MAVLink"). In an embodiment involving the MAVLink protocol, a heartbeat message sent from the UAV may be encoded (in hexadecimal form) as, e.g., "FE-09-9F-01-BE-00-00-00-00-00-02-00-00-03-03-28-52", while an altitude message may be encoded as "FE-1C-A9-01-BE-21-55-3C-8E-0F-65-51-10-1A-05-CC-AD-D0-0ED-6-02-00-00-00-00-00-00-00-00-00-00-00-00-83-3C".

Alternatively, the communication request may be formatted in a more human-readable form, such as a query string. For example, the communication request may include the query string "msg=att&pitch=0.1379&roll=0.1801&yaw=0.0123".

The communication request may be encrypted before it is sent. For example, the communication request may be encrypted using a symmetric encryption key (e.g. an AES encryption key) known to both the UAV and the recipient of the communication request. The communication request may include the encrypted message as part of the query string of a GET request (e.g., with the encrypted message encoded in base64).

In some embodiments, step 903 includes receiving a communication request from a UAV. Step 903 may also include updating the mission status using information derived from the communication request, and/or responding to the communication with a communication response.

Upon receipt, the communication request may be decrypted using the appropriate symmetric encryption key and/or checked for message integrity. The communication request may also be processed to authenticate the sender of the message (i.e. the UAV).

If the communication request contains status update information (e.g. the UAV's current GPS coordinates, the UAV's battery levels, etc), the mission status will be updated using the status update information.

As mentioned above, step 903 may also include sending a communication response in response to the communication request. The communication response may be a GET response, transmitted over a TLS (i.e. https) link created using known methods. The response may include new commands for the UAV. These new commands might include: "load mission" (i.e. receive a route with waypoints); "go" (i.e. execute a loaded mission); "report ready status" (i.e. report whether ready for flight); "return to depot" (i.e. fly to take-off point); "hover"; "emergency land" (i.e. land immediately); and "safe land" (i.e. land when landing is safe).

The UAV may receive the communication request and respond to the new commands. In some embodiments, the UAV may send back an acknowledgement that is distinct from a communication request to indicate whether it was successful or not in executing the new commands. In other embodiments the acknowledgement may be in the form of a communication request.

In some embodiments, steps 902 and 903 may be performed repeatedly throughout the delivery mission. Each repetition may occur in accordance to a regular polling rate. For example, a polling rate of 1 second (e.g. spanning the time between each GET request) may be used. The polling rate may also depend on (and/or change based on) how long it takes for the UAV to act on a new command.

Once it is determined that the shipment has been completed at 904, the method may continue by initiating a post-mission routine 1000.

The post mission routine 1000 first checks a delivery routine run at the delivery location. If this not available within a preset time then an error routine is initiated. If this is available, that delivery routine for an indication that the article or payload has been delivered. A check for this can be run at set time intervals, and if no ALL CLEAR received within a set time, an error routine would be run. Once an indication that the article has been delivered (ALL CLEAR), then the routine ends and goes to a billing routine.

The method may also include the step of running a return mission check 1100 and sending the UAV back to the start location 1102, or to another desired location. In some cases, the UAV may be sent, at 1102, back empty (i.e. not carrying any articles). The return mission check 1100 may include checking whether any article shipments have been requested to be made from the destination location within a given timeframe 1104, 1106. Where another shipment has been requested from the destination location (which may become the new start location) that can be effected by the same UAV, the method steps described above may be repeated 1108, and where required, after replacing or charging a battery. Where no suitable shipments have been requested and where the UAV is sent back, at 1102, to the start location, the method steps described above may be repeated once the UAV returns to the start location.

The method can also include taking over the control of a UAV from semi-autonomous operation, and controlling the UAV manually. This can be done using commercially available ground control software and/or hardware, that has been developed for controlling UAVs or drones from a distance.

Such remote control of UAVs may be effected using a minimum number of sensors, to minimize data transfer required from the UAV to a ground location where the control is effected. In particular, it may be advantageous to omit a camera from the UAV, as data requirements for a video feed can be large. For example, it may be possible to use sensors on the UAV giving altitude, speed and orientation, and also to use satellite information. Thus, the method envisages monitoring UAVs during the course of the individual flights or missions. If there is anything in the check on the status indicating an unusual occurrence, for example some fault indication on the UAV itself, or the UAV unexpectedly having to deviate from a set or predetermined route, due to detecting an obstacle, then a decision can be made to take over control of the UAV flight path and to fly the UAV manually.

Further, each flight path may include predetermined safety points or zones, i.e. locations along the flight path where the flight can be terminated for any reason. Preferably, these are spaced a minimum distance apart, so that, except in extreme cases, the UAV should always be a short distance from one of these safety zones. Thus, if any malfunction is detected in the UAV, for example a failing rotor or motor, or sudden indication that there is unexpected change in battery status, then the UAV can be directed to a safety zone. Coordinates for these safety zones may be loaded into the UAV when the flight routed is uploaded to the UAV. Then, if there is a complete loss of communication due, for example, to a major failure, the UAV will utilize the predetermined safety zones within its autopilot system to navigate to a safety zone without requiring any other input or command. Accordingly, it may be possible to have the UAV semi-autonomously fly to a safety zone. Alternatively, as soon as an error condition is detected and if communication is still possible with the UAV, a person at a ground Station can take over manual control of the UAV, and guide it to a safety zone.

Where possible, i.e. where the UAV is still flyable, it will be guided to a landing at a safety zone. However, it is also envisaged that a UAV could include a parachute. In extreme cases, where it is not possible to reach a safety zone and/or where there is some major failure that prevents the flight from continuing, then the parachute can be activated, to ensure that the UAV fall at an acceptable rate to the ground.

Fully 'autonomous' means the ability for a UAV 112 to execute processes or missions using onboard decision making capabilities, without any external input. An autonomous UAV system is not designed to permit any external intervention.

'Semi-autonomous' operation, on the other hand, means that a UAV may operate autonomously at least part of the time. In general, it is expected that control of a UAV will be semi-autonomous, in the sense that the UAV will be capable of at least limited autonomous operation, but at the same time, the flight management system 147 may be configured to take control of a UAV 112, The determination to take over control of a UAV 112 may be made either by the flight management system 147, either from data received from the UAV 112 or based on other factors or data independent of the UAV; alternatively, the UAV 112 may make a request of the flight management system 147 to take over control of the UAV 112, for reasons detailed below. Additionally, in certain jurisdictions, regulations may require that a UAV not be operated autonomously in certain circumstances or in certain locations; e.g. at busy locations or intersections in a route network or near airfields, autonomous operation may be prohibited.

In general, UAVs 112 may be in constant communication with the flight management system 147, in the sense of transmitting data at regular, set intervals concerning the status of a UAV 112, including:

(i) its location, speed, heading, etc.;
(ii) status of onboard components of the UAV including indication of any failures; and
(iii) weather information, such as temperatures and local wind conditions measurable by the UAV 112.

Transmission of such data alone does not result in loss of autonomous operation. The data flow may be entirely one way from the UAV 112 to the flight management system 147; alternatively, there may, even in autonomous operation, be transmission of data from the flight management system 147 to the UAV 112, e.g.; updated weather information; updated information on obstructions in the flight path, but such data transmission alone does not constitute loss of autonomous operation.

The reasons for taking control of a UAV 112 may include:
(i) UAV sending indication of failure or malfunction of one or more components critical to navigation;
(ii) UAV encountering unexpected weather conditions;
(iii) UAV 112 encountering obstacle of other interruption in planned route and not being able to navigate around it, resulting in UAV requesting that control of the flight path be taken away from the UAV.

Where the flight management system does take control of a UAV 112, generally this may be effected in one of two ways. Firstly, control could be fully manual, and a human pilot could take control of the UAV 112. In the case of any malfunction in the UAV, this would require that the UAV 112 be still capable of transmitting reliable information to enable such manual operation, e.g. information on location, height, heading, speed, etc. Secondly, where possible, this may comprise automated components of the flight management system 147 taking over automated functions from the UAV 112, so human input would not be required.

A flight management platform 140 may comprise separate components, shown in FIG. 12, as a logistic system 145, a mission planner 146 the flight management system 147 and an asset management system or program 148. Further as shown, third party applications 150, which can comprise a billing system 151, a ticketing system 152 and a ground control 153, are all connected and in communication with the flight management platform 140.

Further as shown, various communications 156 such as satellite, Wi-Fi, cellular wireless communication, radio frequency communication, etc. can be used, to communicate with individual auto-pilot systems of a UAV fleet as indicated at 158.

The mission planner 146 may evaluate multiple criteria, to determine if a mission or a delivery is viable. These can include:

I. client is in good standing and that the order is in and approved by the billing system;
II. weight and size are within an allowable limits as set for the UAV fleet;
III. the deliver location has a UAV available or one can be available within a prescribed terminal;
IV. checks at the departure and destination locations are clear;
V. a UAV assigned for the delivery has a status that is good;
VI. a selective flight path does not violate any restriction in their restrictions database;
VII. flight path distances and package weight are within limits;
VIII. weather for the flight path is good and within an acceptable weather score;
IX. for a delivery from a prescribed location to another prescribed location, the coordinates will be available and can be checked;
X. for possible delivery from a prescribed destination location to a customer or client defined location, check that the GPS coordinates are available and that there are no other restrictions or obstructions in the calculated flight path;
XI. regulatory requirements e.g. for Transport Canada, have been complied with and have been granted approval (which may be a blanket approval or a one time approval), and also for NAV Canada;
XII. the mission planner 146 waits for the report from the flight management system 147 on the status of the mission, e.g. completed—failed—aborted;
XIII. for a completed mission or delivery details would be reported to a billing system 151;
XIV. update the fleet management system with details of the UAV usage and other data;

The ground control 153 will be used to monitor UAV units deployed. It is envisioned that there may be separate operators, each operating a number of UAVs. The ground control 153 will be in communication with individual operators. An operator for the ground control 153 can drill down or get more details for individual regions, e.g. a region assigned to particular operator, and assume control over a UAV or change paths as required. This can be in association with a large screen dash board providing an aerial view and indicating UAVs as deployed, flights, weather, etc.

Such a map can indicate things such as no fly zones, health status indicated by colour, regional weather conditions, and UAVs currently in use. Colors can be used to indicate status of a UAV. For example, elements such as weather, distance, status of rotors may all be indicated. If the battery life becomes low, then this can be indicated with a yellow status, to indicate that it should be monitored.

The screen can provide for way point details, including latitude, longitude, altitude or height, and current temperature. It can indicate that this is a start or a destination point and whether it is a proposed or actual waypoint for a flight. Payload details can also be displayed.

The system can be such that individual UAVs can be shown on the screen simply as, for example a dot or circle. If a curser hovered over particular UAV, then further details can be displayed such as speed, weather conditions and the location, distance to waypoint, distance to destination, etc.

Figure 13:
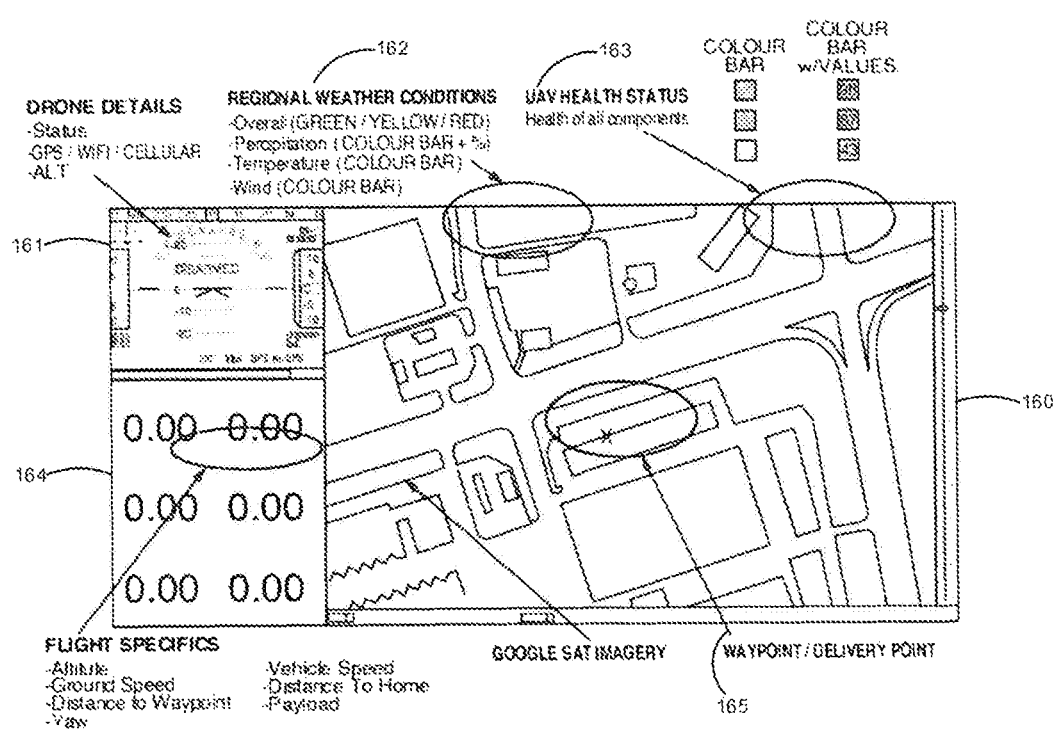
FIG. 13 is a schematic diagram of a display showing details of a UAV flight.

FIG. 13 shows a ground control operator view of a UAV, zoomed in to show detail. Thus FIG. 13 shows satellite imagery 160. At the top left hand corner, this can show a UAV or drone details at 161, including status, GPS/Wi-Fi/Cellular and other data including altitude, direction, rate of climb, etc.

Regional weather conditions can be indicated as shown in 162, including an overall weather score, precipitation, temperature and wind. All of these can be represented by a color bar.

At 163, the UAV health status is indicated as shown by the color bars.

Flight specifics can be indicated at 164, and again, colors can be used. These can include altitude, ground speed, distance to waypoint, yaw, vehicle speed, distance to home, payload, vertical speed.

At 165, a waypoint or delivery point is indicated.

Figure 14:
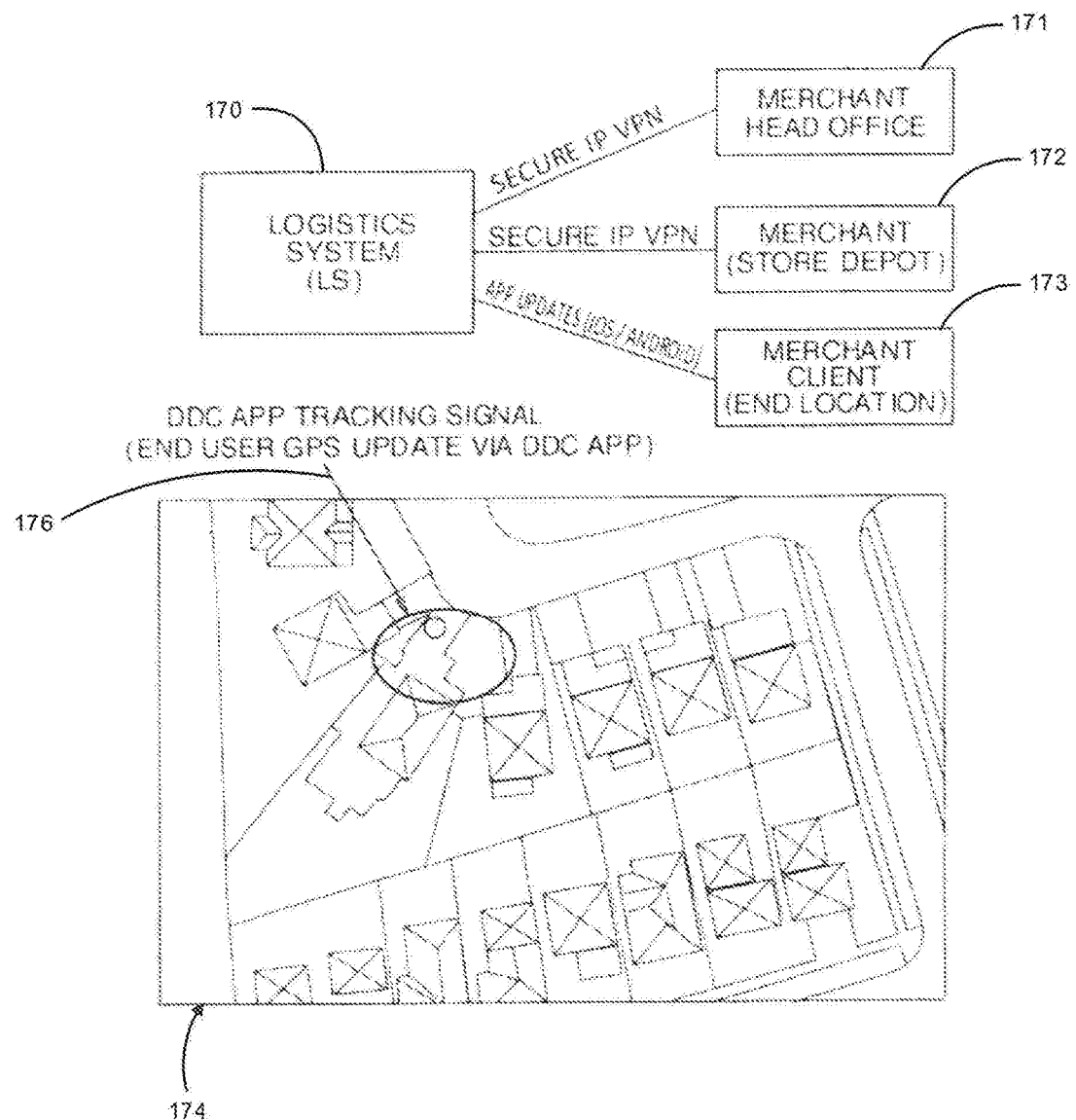
FIG. 14 is a schematic diagram indicating relationships of a logistics system.

With reference to FIG. 14, this shows a logistics system at 170 connected by a secure IP Virtual Private Network (VP) to a merchant head office 171 and similarly connected to a merchant store depot 172. It can also be connected to a merchant or client location for App updates as shown at 173. FIG. 14 also shows Google satellite imagery 174 showing a tracking signal at 176. The logistics system 170 may be the front interface between the client or customer, and the system operator. The logistic system 170 receives requests and inputs from the clients. The system can be provided by way of interface or an API that provides seamless integration into a client's ERP system.

The API is designed to provide a real-time updates for the client's ERP system, as well as real-time interface for the individual client depots.

The web interface will provide a fully independent system for the client to use as they wish not to interface with the API.

Shipments are submitted by the logistic system and then processed by the mission planner 146.

The logistics system interface also connects with other systems such as the billing system 151 and the ticketing system 152 to display transaction data related to each specific client.

FIG. 14A shows one possible embodiment of a New Order GUI, e.g., provided by the logistics system to the client. In this embodiment, New Order GUI shows details of article shipment requests, e.g., associated with the client or customer. For each article shipment request, New Order GUI also shows details may include, e.g., the date of the request, a tracking number associated with the request, a first zone associated with the request, a second zone associated with the request, a UAV departure time associated with the request, a UAV arrival time associated with the request, and the status of the request. New Order GUI may also include filter controls and a search box for locating a specific article shipment request.

The UAV departure and arrival times may be, respectively, the actual UAV departure and arrival times associated with the article shipment request; as such, for a particular article shipment request, the fields may be empty if, e.g., the flight management system has not yet determined the UAV departure and/or arrival times for a particular article shipment request. In other embodiments, the UAV departure and arrival times listed for each article shipment request may be estimates.

FIG. 14B shows one possible embodiment of Request Form associated with the New Order GUI. The Request Form is used to create new article shipment requests, and may be accessed, e.g., by a button labeled "New Shipment" in a New Order GUI. In this embodiment, the Request Form includes a selector for a first zone, a selector for a second zone, input fields for package dimensions, a selector for the units to be associated with the inputted package dimensions, an input field for package weight, a selector for the units to be associated with the inputted package weight, an input field for package value, a selector for the units to be associated with the inputted package value, a selector to designate the priority of the request, and an input field for comments.

FIG. 14C shows one possible embodiment of a location status GUI, e.g., provided by the logistics system to the client. The location status GUI displays the locations that a client can choose as the first and/or second zones of an article shipment request. In some embodiments, the location status GUI may categorize these locations as internal zones or external zones, where the internal zones correspond to, e.g., zones associated with venues owned by the client, and the external zones correspond to, e.g., zones not associated with venues owned by the client. In the embodiment of FIG. 14C, four zones are shown in different states, showing a zone where the UAV or drone is in flight, one zone available, one zone unavailable and one with UAV/drone being prepared. The location status GUI may also display what assets are available at a particular zone.

An asset management system 148 may be a record management system for assets relating to the UAV operational system. It may be accessible through a GUI interface as part of the overall system. Key components to the AMS are an asset database for the intensive customize attributes, a provisioning work order system and the ability to add, change, and retire assets.

The asset management system 148 may be the system of record for all items that are deployed and maintained, including UAVs, charges, batteries, specialized components for holding articles, etc.

It may be based on existing aircraft maintenance systems and key records of all pertinent components and relevant data, e.g. flight time, number of landings, rotor hours, etc. The main users that will interact with the asset management system 148 are provisioning staff and technicians.

Critical components to maintenance system are a UVA PM (Preventative Maintenance) schedule, life cycle management, parts warehouse, technical schedule, documentation and procedures, repair costs and integration into an accounting system.

FIG. 14D shows one possible embodiment of an asset management system GUI. The asset management system GUI shows asset details. In this embodiment, these details include, for each asset: a category associated with the asset (e.g. "UAV", "Battery", "Antenna"), a unique identifier associated with the asset, a serial number associated with the asset, a description of the asset, and the status of the asset. The asset management system GUI may allow the details of a particular asset to be edited by way of, e.g., a selector control, opened by clicking on a particular detail. The asset management system GUI may also allow new assets to be created, e.g., through the use of a "Create Assets" button. In some embodiments, the ability to create assets and/or to edit the details of existing assets may be disabled for some users (e.g. non-administrators). The asset management system GUI may also include filter controls and a search box for locating a specific asset.

The billing system 151 can be the ERP system that provides the financial backend of the enterprise, and critical components may include: client billing account; billing account status (active/inactive); and billing credit limits and standing (good/hold).

The ticketing system 152 is a system that keeps audit trail for a client's internal requests. All client's and system operator's interactions will be done by the logistics interface. Workflows within the ticketing system will keep flows for the customer service, provisioning, sales and client's requests in order and SLA's will be implemented and monitored by the ticketing system. The logistics platform may provide for a GUI for the ticketing system and a unified interface to eliminate the need for multiple logins. Users will have the ability to create, view and update tickets dependent on their security levels. SLA's (Service Level Agreements)

will be monitored by the ticketing system and emails alerts will be triggered upon specific violations.

FIG. 14E shows one possible embodiment of a ticketing system GUI. The ticketing system GUI provides details about tickets associated with a client. A ticket could be associated with any client-related matter; some examples include, for instance, a client's request for support, an inquiry submitted by a client, and a billing matter associated with a client request. In this embodiment, the ticketing system GUI shows the following details for each ticket: a ticket identifier, an employee to which the ticket is assigned, a department by which the ticket is best served, a priority associated with the ticket, the subject of the ticket, and the status of the ticket.

In some embodiments, tickets are not created with an assigned employee; it is up to, e.g., that employee to claim the ticket. In these embodiments, the associated field (i.e. the one disclosing the employee to which the ticket is assigned) may be empty until the ticket is claimed by an employee.

The priority field in FIG. 14E shows two possible priority values (i.e. "High" and "Normal"); however, any number of priority values may be used. This also applies to the status field; only "Open" and "Closed" are shown, but in practice any number of statuses can be used.

Figure 15:
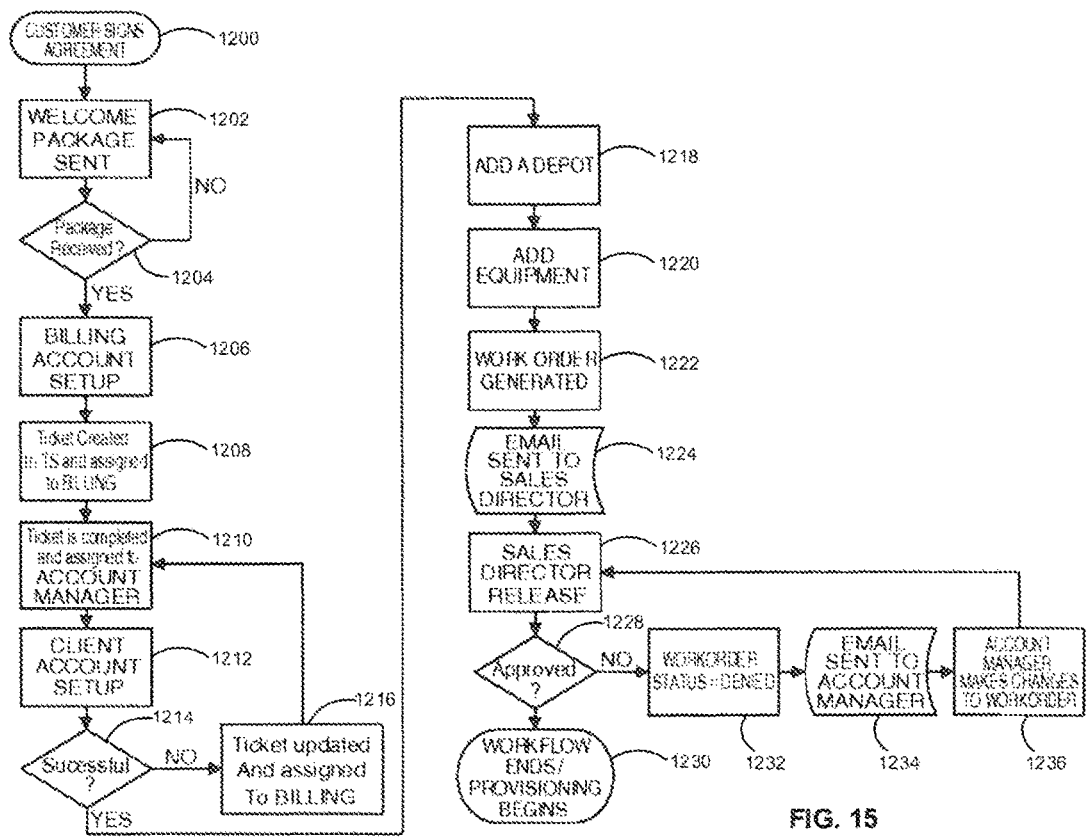
FIG. 15 is a schematic workflow showing setting up of a customer account.
Figure 16:
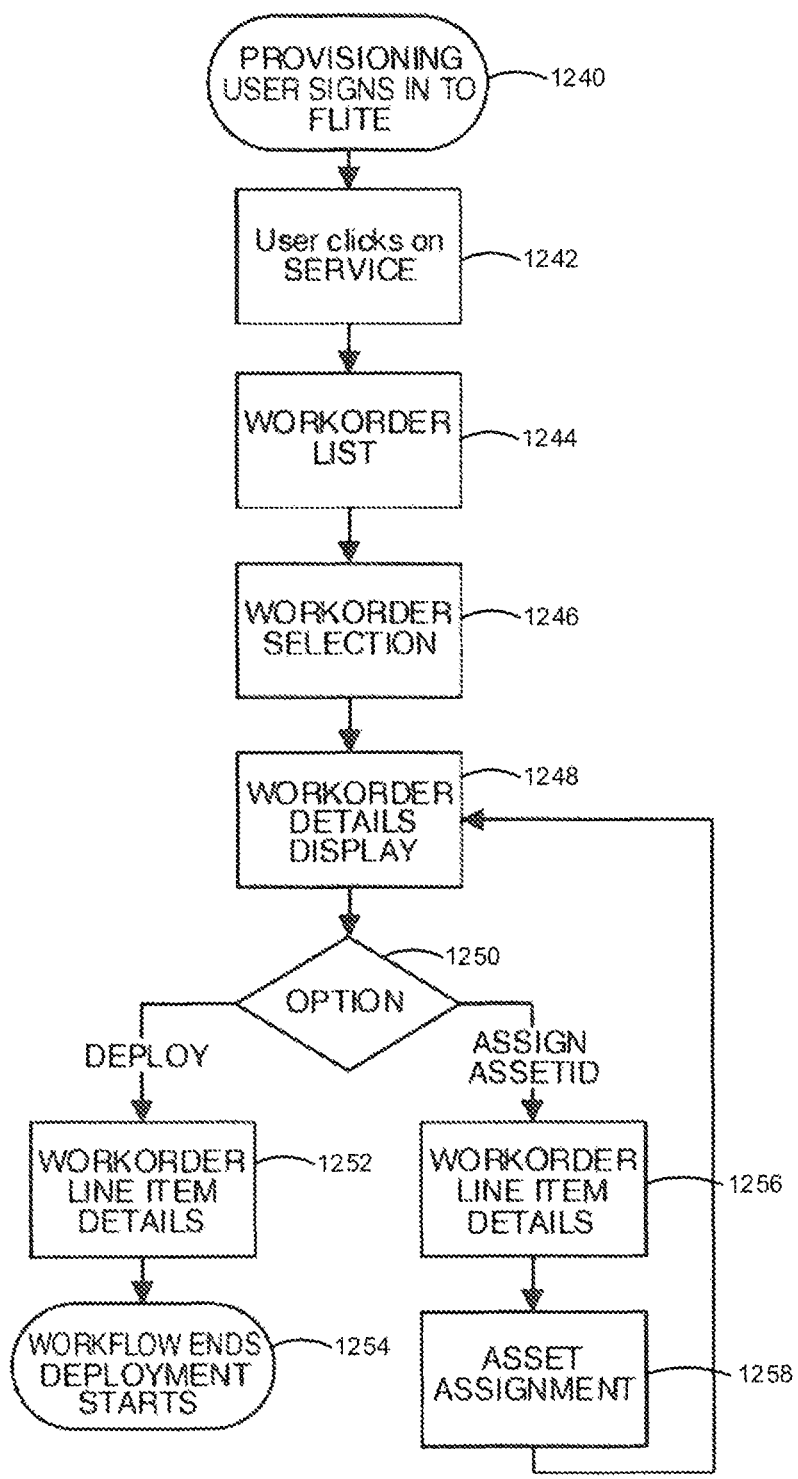
FIG. 16 is a schematic workflow for work order.

FIGS. 15 and 16 show workflows for setting an agreement with a customer and for a signing work order for a particular delivery.

The systems and methods described in this document may be selected, configured, and manufactured using any combination of suitable known materials, technologies, and manufacturing and assembly methods. It will be appreciated that the various methods steps described above may be, depending on the circumstances, carried out in sequences other than the sequences described above.

A number of embodiments and example implementations have been described herein. However, it will be understood by persons skilled in the art that other variants and modifications may be made without departing from the scope of the embodiments and examples as defined in the claims appended hereto. A person skilled in the art will also recognize that the embodiments described above should be read as representative of a plethora of permutations not explicitly described, the permutations incorporating elements from various embodiments.

In FIG. 15, the setting up of an agreement with a customer or client commences at 1200 with the customer signing an agreement. At 1202, a welcome package is sent; at 1204 if this is received the procedure continues, or returns to 1202 to resend the welcome package. At 1206, a billing account is set up and at 1208 a ticket is created in the time system and assigned to billing. At 1210, the ticket is completed and assigned to account manager. The client account is then set up at 1212, and 1214 a check is made for this set up being successful. If it is unsuccessful, at 1216, the ticket is updated then assigned to billing and the routine returns to 1210.

Assuming the setup is successful, then a depot is added at 1218 and equipment is added at 1220. A work order can then be generated at 1222 and an email is sent to the sales director at 1224. At 1226 the sales director can approve and release the work order, as further indicated at 1228. If approved, the work flow ends and provisioning begins as indicated at 1230.

If the work order is not released or approved, then at 1232 work order status is set to 'denied', and an email is sent to the account manager. At 1236, the account manager can make changes to the work order, before returning this to the sales director at 1226.

Referring to FIG. 16, commencing at 1240, a provisioning user signs in to the system indicated at Flite. At 1242, the user can click on work orders/open, and the users is then presented with a work order list at 1244. At 1246, a work order selection is made, and 1248 work order details are displayed.

At 1250, the user has an option to deploy, or assign asset ID. As indicated at 1250 a work order line items are provided, and 1254 a work flow ends and deployment starts.

Alternatively, at 1250 if user selects assign asset ID, then at 1256, work line item details are provided, and an asset assignment is made at 1258.

Referring to FIGS. 17 to 20, these show details of a flight route network, generally indicated at 250. The route network 250 provides a number of predetermined route sections, to enable predetermined routes to be established.

The individual route sections are indicated at 252, and each route section 252 connects nodes 254 together, or may connect a node 254 to a depot indicated at 256; it is also possible that a route section could extent directly between two depots 256 without and intervening node 254. The nodes 254 are provided at waypoints in the network.

The route section 252 may provide for travel in just in one direction, but usually are expected to provide for a travel in both directions along the route section. The nodes 254, as shown more clearly in FIGS. 18 to 20, should define a sufficient space for UAVs to transition from one route section 252 to a connecting route section 252. The nodes 254 and parts through the nodes 254 should also be configured to ensure safe passage of UAVs between multiple route sections connected to that node, when there may be a multiple UAVs passing though the nodes at one time. When multiple UAVs are passing through a node at one time, the routes will be adjusted accordingly to include spatial separation in altitude or lat./long., i.e vertically and/or horizontally. A pre-determined separation value (e.g. 30m) will be set within the mission planning system and will utilized when necessary in the route planning stage. In the event that a UAV does come within a prescribed distance of another UAV, the avoidance systems on the UAVS will make necessary evasive maneuvers to ensure that a collision does not occur.

Figure 17:
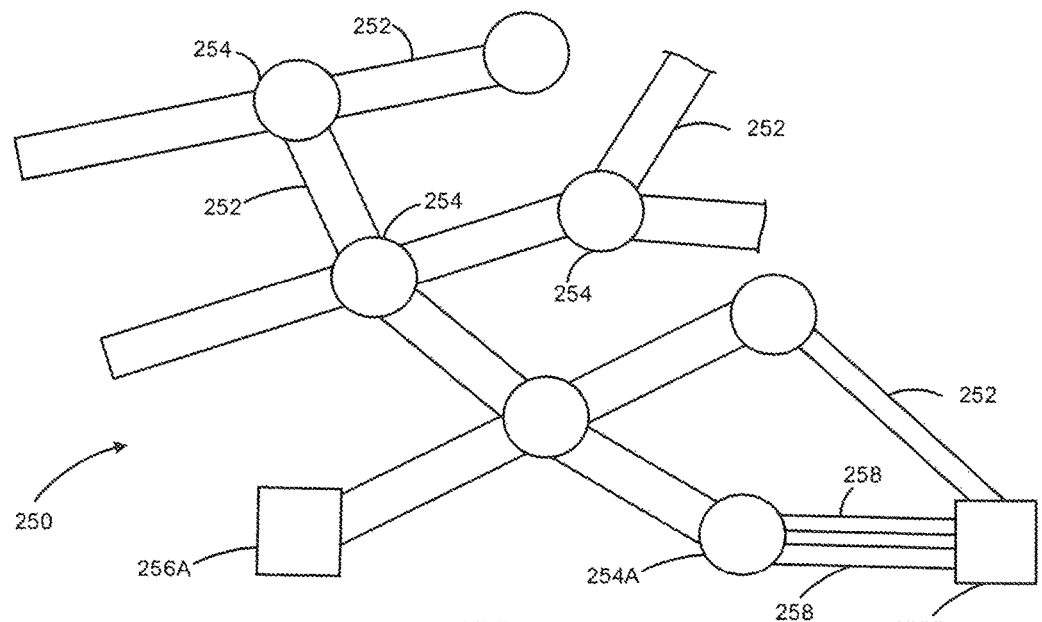
FIGS. 17 to 20 are schematic diagrams of flight routes.

As indicated in FIG. 17, a depot 256A may have just one connecting route section 252A that connects it into the route network 250.

Alternatively, as indicated at 256B, a depot, depending on its location and size may have multiple connections to a number of route sections 252. Additionally, as shown in 258, where it is anticipated or known that there will be a high volume of traffic between the depot 256B and a specific node indicated at 254A, then, in effect, multiple route sections indicated at 258 can be provided. This is analogous to the provision of multi-lane highways, for high traffic densities.

Figure 18:
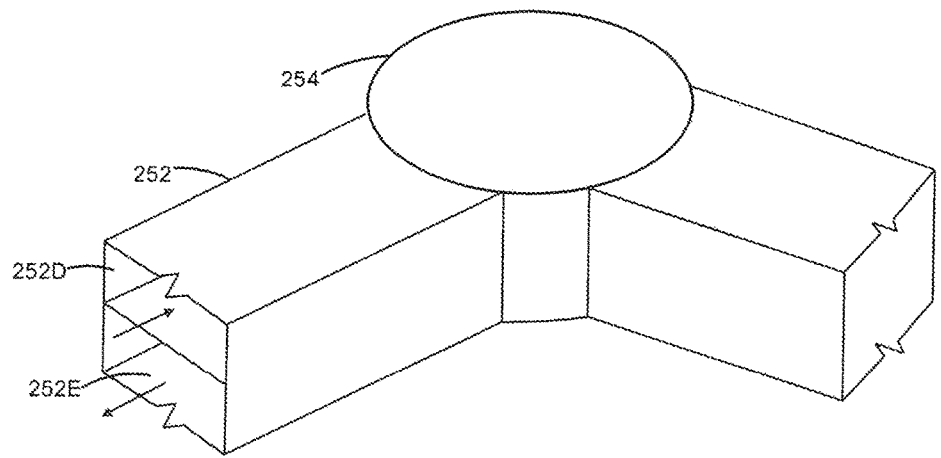
Figure 19:
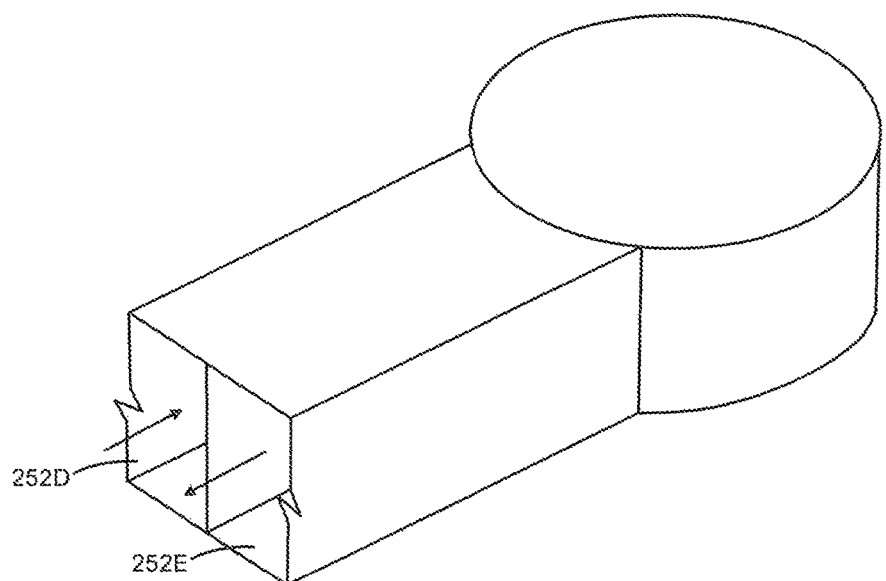

FIG. 18 shows an example of accommodation of UAVs traveling in different directions along a route section 252. As indicated, UAVs can travel in one direction along a corridor 252D of the route section, while in another corridor 252E UAVs travel in the opposite direction. As shown in FIG. 18, the two opposing corridors 252D, 252E are above one another, and thus have the different heights or altitudes. Alternatively, they can be provided side by side, as shown in FIG. 19. Providing the corridors stacked with different altitudes may enable best use to be made of prevailing winds.

The different nominal heights could be 300-350 ft for one corridor, and 350-400 for a corridor above that one corridor.

It is also possible that two corridors could be provided with both horizontal and vertical spacing to provide an additional safety margin.

Figure 20:
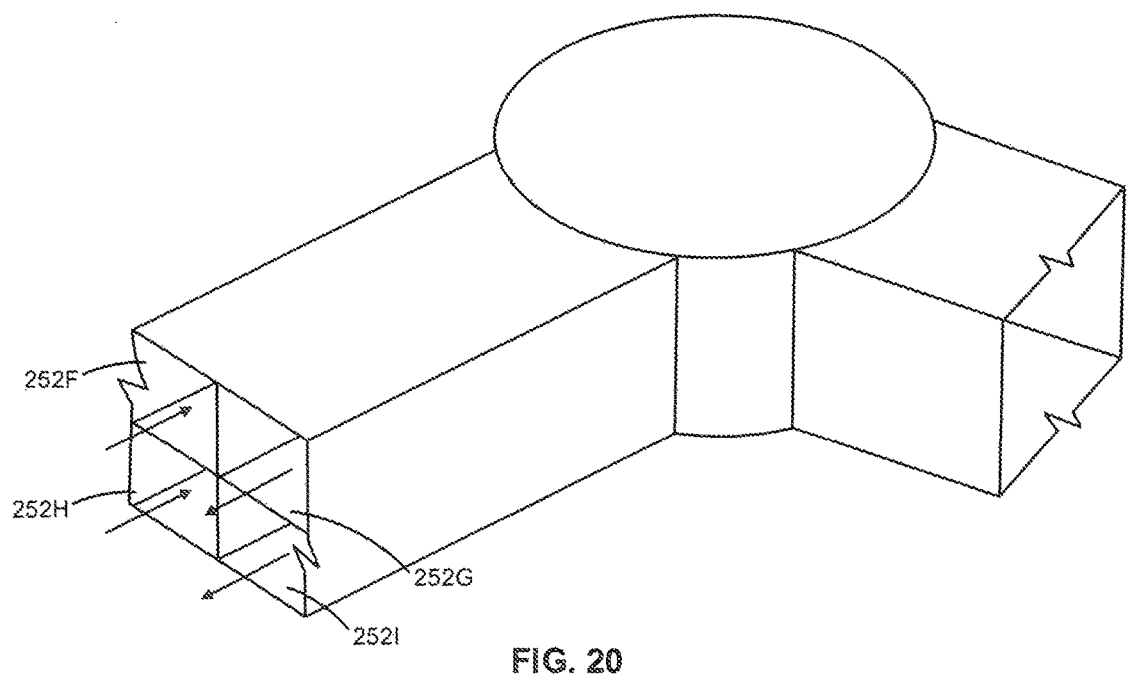

FIG. 20 shows a further variant, where a route section 252 is divided into four corridors 252F, 252G, 252H and 252I. Here, it is anticipated that the route section 252 will be travelled by UAVs travelling at significantly different speeds, requiring separation between a first group of UAVs that can be classified as slow moving and a second group of UAVs that can be classified as fast moving. For example, "quadcopter" or other multi rotor UAVs will generally travel more slowly than "fixed wings" UAVs. Additionally, even for one type of a UAV, the speed may depend upon the weight of an article to be delivered.

In the example shown in FIG. 20, the corridors 252F and 252H are intended for travel in one direction, and one could be assigned to slow moving UAVs and the other to fast UAVs. Correspondingly, the corridors 252G and 252I are indicated as being for travel in the opposite direction, and likewise could be assigned to slow moving and fast moving UAVs, respectively.

As for any aircraft, UAVs may be affected by weather conditions, particularly wind direction and velocity. Accordingly, the route sections may be adjusted depending upon current or expected weather conditions. For a typical route section may extend between 300 to 400 ft and have a width of 50 ft providing two vertically stacked corridors each a square 50×50 ft. For most applications, it is expected that the altitude will be defined as above ground. For some applications, it may be possible or desirable to define in absolute terms, i.e. as above sea level.

Additionally, regulations, while requiring that the defined cross-section of a route section is fixed, e.g. as 100×50 ft. as in the above example, that there is some considerable latitude as to the height of which is provided. Thus, for example when there is strong head wind, it will generally be desirable to provide the route section at as lower as altitude as possible, where the head wind is expected to be less. Where is a following wind, correspondingly, it may usually be desirable to provide the route section at as high altitude as regulations permit.

Each corridor, or a route section may be defined by a centre line, e.g. as indicated by the arrows in FIGS. 18-20, and by a lateral extent or width on either side of the centre line, so that each corridor or route section can, as shown, be considered or defined as an elongate path of square or rectangular section.

Location of the route sections, nodes, etc. may take into account obstructions such as buildings, towers, power lines, telephone lines and like obstructions.

Special provisions may need to be made for temporary obstructions, such as construction cranes and the like.

While route sections may be defined precisely, regulations may permit for certain standard deviations from the route particularly to avoid identified obstructions, such as an individual bird or flock of birds, e.g. geese which can present a large obstruction.

For some applications, it may prove possible to define at least some route sections so as to follow existing corridors in urban and like environments. High voltage powerlines are often provided in relatively wider corridors, which are, again usually, straight and have well defined characteristics. On the other hand, it may be desirable to maintain a high separation between UAVs and this type of powerline. It may also be possible to provide route sections following major highways railway lines, rivers and the like. Further, while the individual route sections or corridors are shown as straight, in many instances they can include curved sections, and may follow or be determined by fixed geographical or other features, such as natural contours, rivers and the like.

The term depot, as used herein, is to be given a broad meaning. A depot can be a location or site. Further, a 'depot' associated with a particular user or customer can be a location or site belonging to that customer, or it may be a location or site of another entity or organization that is a customer or has a business or other relationship with that user or customer.

A number of embodiments have been described herein. However, it will be understood by persons skilled in the art that other variants and modifications may be made without departing from the scope of the embodiments as defined in the claims appended hereto. A person skilled in the art will also recognize that the embodiments described above should be read as representative of a plethora of permutations and combinations not explicitly described, the permutations and combinations incorporating elements from various embodiments. More particularly, other variants may comprise any possible, practical combinations of features disclosed in the claims, beyond those defined by the claims and their dependencies.

The invention claimed is:

1. An unmanned aerial vehicle (UAV) delivery system, for delivering articles between at least one first UAV zone and at least one second UAV zone, comprising:
   at least one computing system, operable by a UAV delivery service provider, having a non-transient memory with executable instructions, the executable instructions including a flight management system and a mission planner;
   a first UAV zone;
   a second UAV zone;
      a database storing details of a flight route network comprising the first and second UAV zones, a plurality of nodes, a plurality of route sections connecting the UAV zones and the nodes to form the flight route network, the route sections having been been subject to regulatory approval and the database being connected to the flight management system and the mission planner;
   wherein the computing system is operable with said instructions:
   a) to provide an article delivery portal, to receive at the portal, from a customer of the UAV delivery service provider, at least one delivery request to deliver at least one article from the first zone to the second zone;
   b) to assign a UAV to the delivery request;
   c) if a UAV is not at the first UAV zone, to dispatch a UAV to the first zone, including providing the UAV with a flight path to the first UAV zone;
   d) having the mission planner provide a flight path to the UAV along the flight route network comprising a plurality of route sections and at least one node, from the first zone to the second zone, the flight path being predetermined;
   e) to communicate the UAV flight path to the UAV; and
   f) to monitor the flight of the UAV from the first zone to the second zone and the delivery of the article and to provide updates on the delivery request to the customer,
   wherein each route section has minimum and maximum altitudes, and a lateral width of the route section, and
   wherein at least some of the route sections comprise two or more corridors spaced apart vertically and/or horizontally, wherein at least one corridor is designated for travel in one direction and at least one other corridor is designated for travel in an opposite direction, including two corridors for travel in one direction and two corridors for travel in an opposite direction, and wherein, for each direction, there is one corridor for UAVs traveling at a first range of speeds, and a second corridor for UAVs traveling at a second and different range of speeds.

2. The UAV delivery system of claim 1, wherein the delivery request includes at least: a UAV category request, a timeframe request, and an article description.

3. The UAV delivery system of claim 2, wherein the article description includes a weight and a set of dimensions of the article.

4. The UAV delivery system of claim 3, wherein the computing system is operable with the instructions to receive a response from the flight management system in response to the delivery request to convert the response into a customer update, and to communicate the update to the portal.

5. The UAV deliver system of claim 1,
wherein at least one of the first and second UAV zones includes an enclosure, an opening in the enclosure, a closure for the opening and a lock for the closure, providing for controlled access to the UAV zone by the customer, the lock being connected to flight management system for control thereof, and wherein the flight management system only permits a
UAV to enter each UAV zone when that zone is secured and free of obstructions.

6. The UAV delivery system of claim 1, wherein the first UAV zone is operable with the computing system to provide for a takeoff of a UAV from the first UAV zone, and the second UAV zone is operable with the computing system to provide for a landing of the UAV in the second UAV zone.

7. The UAV delivery system of claim 1, wherein the computing system is operable with the executable instructions to generate a unique identifier for the article, to communicate the unique identifier to the portal for access by the customer, and to provide an instruction to the customer via said portal to attach said unique identifier to the article.

8. The UAV deliver system of claim 7, wherein:
the UAV delivery system includes at least one UAV;
the at least one UAV has a sensor and a communications module; and
the sensor and communications module are in communication with a processor and are operable with the processor to: a) read the unique identifier, b) generate a corresponding validation signal, and c) communicate the validation signal to the computing system.

9. The UAV delivery system of claim 8, wherein the UAV has a label to identify the UAV.

10. The UAV delivery system of claim 8, wherein the UAV has a display operable to display user-instructions to the customer, and the computing system is operable with the executable instructions to validate the validation signal and generate a corresponding result, to generate a set of user-instructions based on the result, and to display the set of user-instructions via the display for the customer.

11. The UAV delivery system of claim 10, wherein the set of user-instructions includes at least one of: a) an instruction to reduce the weight of the article by a stated amount, b) an instruction to assign the article to a stated UAV, and c) an instruction to position the UAV on the first UAV zone.

12. The UAV delivery system of claim 11, wherein the first UAV zone includes at least one sensor operable with the computing system to determine when the UAV has been positioned on the UAV zone, and the computing system is operable to request a confirmation from the customer that the customer has readied the UAV for takeoff.

13. The UAV delivery system of claim 8, wherein the second UAV zone includes a landing identifier and the UAV is operable with the computing system and flight management system to identify the landing identifier at least during an approach of the UAV to the second UAV zone, and to land at the landing identifier.

14. The UAV delivery system of claim 13, wherein the second UAV zone includes a portable portion, and said portable portion includes the landing identifier.

15. The UAV delivery system of claim 8, wherein the computing system is operable with the executable instructions to perform at least a landing at the second UAV zone.

16. The UAV delivery system of claim 8, wherein the second UAV zone includes at least one sensor operable with the computing system to detect an approach and landing of the at least one UAV and to record a video of the approach and landing.

17. The UAV delivery system of claim 16, wherein the UAV includes at least one sensor operable with the computing system to detect an approach to and landing of the UAV at the second UAV zone and to record a video of the approach and landing.

18. The UAV delivery system of claim 8, wherein the UAV is operable to engage at least one article and includes at least one sensor mountable to the article, and the sensor is operable with at least one of the computing system and the processor to sense at least one of: a) forces applied to the article, and b) acceleration of the article.

19. The UAV delivery system of claim 18, wherein:
said computing system is operable with said executable instructions to perform at least one of:
a) provide for the viewing of the forces and acceleration via the portal in at least one of: real-time, near real-time, and at custom time interval;
b) record a time plot of the forces and acceleration and provide the time-plot for at least one of review and download via the portal; and
c) identify a maximum force and a maximum acceleration in the forces and acceleration, respectively, and provide the maximum force and acceleration for at least one of review and download via the portal.

20. The UAV delivery system of claim 19, wherein the computing system is operable to determine at least one safe range of the forces and acceleration, and to provide the range for at least one of: review, download, and analysis via the portal.

21. The UAV delivery system of claim 1, wherein each route section is defined by a centre line and a cross section around the centre line.

22. The UAV delivery system of claim 21, wherein the cross-section is rectangular.

23. The UAV delivery system of claim 21, wherein the cross-section is circular or elliptical.

24. The UAV delivery system of claim 1, wherein, for at least some route sections, a portion of each route section is straight and a portion of each route section is curved.

25. The UAV delivery system of claim 1, wherein the altitudes are absolute altitudes relative to local terrain.

26. The UAV delivery system of claim 1, wherein the altitudes are true altitudes relative to mean sea level.

27. The UAV delivery system of claim 1, including obtaining regulatory approval for the flight network and any additional route sections that need to be determined and provided, and that meet predetermined regulatory limits.

\* \* \* \* \*